US012335849B2

(12) United States Patent
Lee et al.

(10) Patent No.: US 12,335,849 B2
(45) Date of Patent: Jun. 17, 2025

(54) ELECTRONIC DEVICE AND METHOD FOR RECEIVING SYSTEM INFORMATION IN ELECTRONIC DEVICE

(71) Applicant: Samsung Electronics Co., Ltd., Suwon-si (KR)

(72) Inventors: Keonyoung Lee, Suwon-si (KR); Kwanghoo Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 17/726,088

(22) Filed: Apr. 21, 2022

(65) Prior Publication Data

US 2022/0345956 A1  Oct. 27, 2022

Related U.S. Application Data

(63) Continuation of application No. PCT/KR2022/005677, filed on Apr. 20, 2022.

(30) Foreign Application Priority Data

Apr. 21, 2021  (KR) ........................ 10-2021-0051617

(51) Int. Cl.
  *H04W 48/14*  (2009.01)
  *H04W 36/00*  (2009.01)
  *H04W 36/08*  (2009.01)

(52) U.S. Cl.
  CPC ...... *H04W 48/14* (2013.01); *H04W 36/00698* (2023.05); *H04W 36/085* (2023.05)

(58) Field of Classification Search
  CPC .. H04L 12/18; H04W 48/12; H04W 36/0083; H04B 7/0413; Y02D 30/70
  See application file for complete search history.

(56) References Cited

U.S. PATENT DOCUMENTS

2015/0282207 A1  10/2015  Ambriss et al.
2016/0044488 A1  2/2016  Kim et al.
(Continued)

FOREIGN PATENT DOCUMENTS

JP  2016/519876 T  7/2016
JP  2020/058058 A  4/2020
(Continued)

OTHER PUBLICATIONS

3GPP TS 38.331 (v16.4.1); TSG RAN; NR; Radio Resource Control (RRC) protocol specification (Release 16); Mar. 30, 2021.
(Continued)

*Primary Examiner* — Mahran Y Abu Roumi
(74) *Attorney, Agent, or Firm* — Jefferson IP Law, LLP

(57) ABSTRACT

An electronic device includes at least one antenna and a processor configured to transmit and receive data to and from the a base station connected by communication, through the at least one antenna, perform a handover from the first base station to a second base station, receive first system information broadcast from the second base station, identify information related to a system information request based on the first system information, identify a time point for transmitting a system information request based on a data inactivity timer, and transmit a system information request to the second base station based on the information related to a system information request at the identified time point for transmitting a system information request.

18 Claims, 17 Drawing Sheets

(56) References Cited

U.S. PATENT DOCUMENTS

| | | | |
|---|---|---|---|
| 2016/0234736 A1* | 8/2016 | Kubota | H04W 48/12 |
| 2017/0013515 A1 | 1/2017 | Bangolae et al. | |
| 2019/0150071 A1* | 5/2019 | Lee | H04W 4/70 |
| | | | 370/328 |
| 2019/0215890 A1 | 7/2019 | Choi et al. | |
| 2019/0349883 A1 | 11/2019 | Fujishiro et al. | |
| 2019/0349886 A1 | 11/2019 | Lee et al. | |
| 2019/0394698 A1 | 12/2019 | Jeong | |
| 2020/0045749 A1 | 2/2020 | Jiang | |
| 2020/0214073 A1 | 7/2020 | Shimoda et al. | |
| 2020/0252838 A1 | 8/2020 | Akdeniz et al. | |
| 2020/0260377 A1 | 8/2020 | Jin et al. | |
| 2020/0322878 A1* | 10/2020 | Prabhakar | H04W 36/1443 |
| 2021/0176674 A1 | 6/2021 | Jung et al. | |
| 2023/0164768 A1* | 5/2023 | Park | H04W 76/28 |
| | | | 370/329 |

FOREIGN PATENT DOCUMENTS

| | | |
|---|---|---|
| KR | 10-2016-0131092 A | 11/2016 |
| KR | 10-2019-0082968 A | 7/2019 |
| KR | 10-2019-0085445 A | 7/2019 |
| KR | 10-2020-0098178 A | 8/2020 |
| WO | 2017/196057 A2 | 11/2017 |
| WO | 2020/087432 A1 | 5/2020 |

OTHER PUBLICATIONS

ZTE Corporation, Sanechips, "Remaining issues on logging of on-demand SI request information," 3GPP TSG-RAN WG2 Meeting #113 bis electronic; R2-2104196; Apr. 2, 2021.

International Search report and written opinion dated Jul. 18, 2022, issued in International Application No. PCT/KR2022/005677.

* cited by examiner

ELECTRONIC DEVICE AND METHOD FOR RECEIVING SYSTEM INFORMATION IN ELECTRONIC DEVICE

CROSS-REFERENCE TO RELATED APPLICATION(S)

This application is a continuation application, claiming priority under § 365(c), of an International application No. PCT/KR2022/005677, filed on Apr. 20, 2022, which was based on and claimed the benefit of a Korean patent application number 10-2021-0051617, filed on Apr. 21, 2021, in the Korean Intellectual Property, the disclosure of which is incorporated by reference herein in its entirety.

TECHNICAL FIELD

The disclosure relates to an electronic device and a method for receiving system information in an electronic device.

BACKGROUND ART

As mobile communication technologies are developed, a portable terminal that provides various functions has become popular. Accordingly, an effort to develop a fifth generation (5G) communication system is being made in order to meet wireless data traffic demand which is increasing. In addition to implementation in a frequency band that the third generation (3G) communication system and the long term evolution (LTE) communication system used to use, implementation of the 5G communication system in a higher frequency band (e.g., 25 to 60 GHz band) is being considered in order to provide high data transmission speed for high data transmission rate.

In the 5G communication system, technologies such as beamforming, massive multiple-input and multiple-output (MIMO), full dimensional MIMO (FD-MIMO), an array antenna, analog beam-forming, and a large scale antenna are discussed to mitigate a propagation path loss in the mmWave band and to increase a propagation transmission distance.

As a method of implementing 5G communication, a standalone (SA) scheme and a non-standalone (NSA) scheme are being considered. Among them, the SA scheme may be a scheme that uses only a new radio (NR) system, and the NAS scheme may be a scheme that uses the NR system together with the legacy LTE system. In the NSA scheme, a user equipment (UE) may use an eNB in an LTE system, and a gNB in the NR system. A technology in which a UE enables different communication systems is referred to as dual connectivity.

DETAILED DESCRIPTION OF THE INVENTION

Technical Problem

In a communication system (for example, LTE or 5G), system information (for example, system information (SI) or system information block (SIB)) may be transmitted in a broadcasting type in each period configured by a network (for example, base station). In the case of the broadcasting transmission type, the electronic device may receive system information fast and accurately, but there may be inefficiency in terms of radio resources because the network needs to constantly transfer the system information.

For example, an on-demand type has been introduced in a 5G communication system such that, if an electronic device requests specific system information from the network, the corresponding system information is provided. In the 5G communication system, system information may be provided such that SIBs other than master information block (MIB) and system information block 1 (SIB1), which are necessary system information, are provided according to configurations in the on-demand type.

If an electronic device in a radio resource control (RRC) connection state hands over to another base station (or another cell), the electronic device may receive system information from the handed-over base station. For example, after releasing release RRC connection with the handed-over base station (for example, in RRC idle state), the electronic device may transmit a system information request to the base station, thereby receiving system information. If a system information request is transmitted after releasing the RRC connection, the electronic device may consume an increased amount of electric current from transmitting the system information request to receiving the requested system information, and this may cause system information reception delay.

Various embodiments may provide an electronic device and a method for receiving system information in an electronic device, wherein an electronic device may receive system information by transmitting a system information request before release of RRC connection with a handed-over base station.

Technical Solution

In accordance with an aspect of the disclosure, an electronic device is provided. The electronic device includes at least one antenna (e.g., first antenna module 242, second antenna module 244, or third antenna module 246) and a communication processor (e.g., wireless communication module 192, first communication processor 212, second communication processor 214, unified communication processor 260), and the communication processor may be configured to transmit and receive data to and from a first base station connected by communication, through the at least one antenna, perform a handover from the first base station to a second base station, receive first system information broadcast from the second base station, identify information related to a system information request based on the first system information, identify a time point for transmitting a system information request based on a data inactivity timer, and transmit a system information request to the second base station based on the information related to a system information request at the identified time point for transmitting a system information request.

In accordance with another aspect of the disclosure, a method of operating an electronic device is provided. The method includes transmitting and receiving data to and from a first base station through at least one antenna, performing handover from the first base station to a second base station; receiving first system information broadcast from the second base station, identifying information related to a system information request based on the first system information, identifying a time point for transmitting a system information request based on a data inactivity timer, and transmitting a system information request to the second base station based on information related to the confirmed system information request at the time point for transmitting a system information request.

Advantageous Effects

According to various embodiments, an electronic device may transmit a system information request before release of RRC connection with a handed-over base station, thereby preventing system information reception delay and reducing current consumption.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
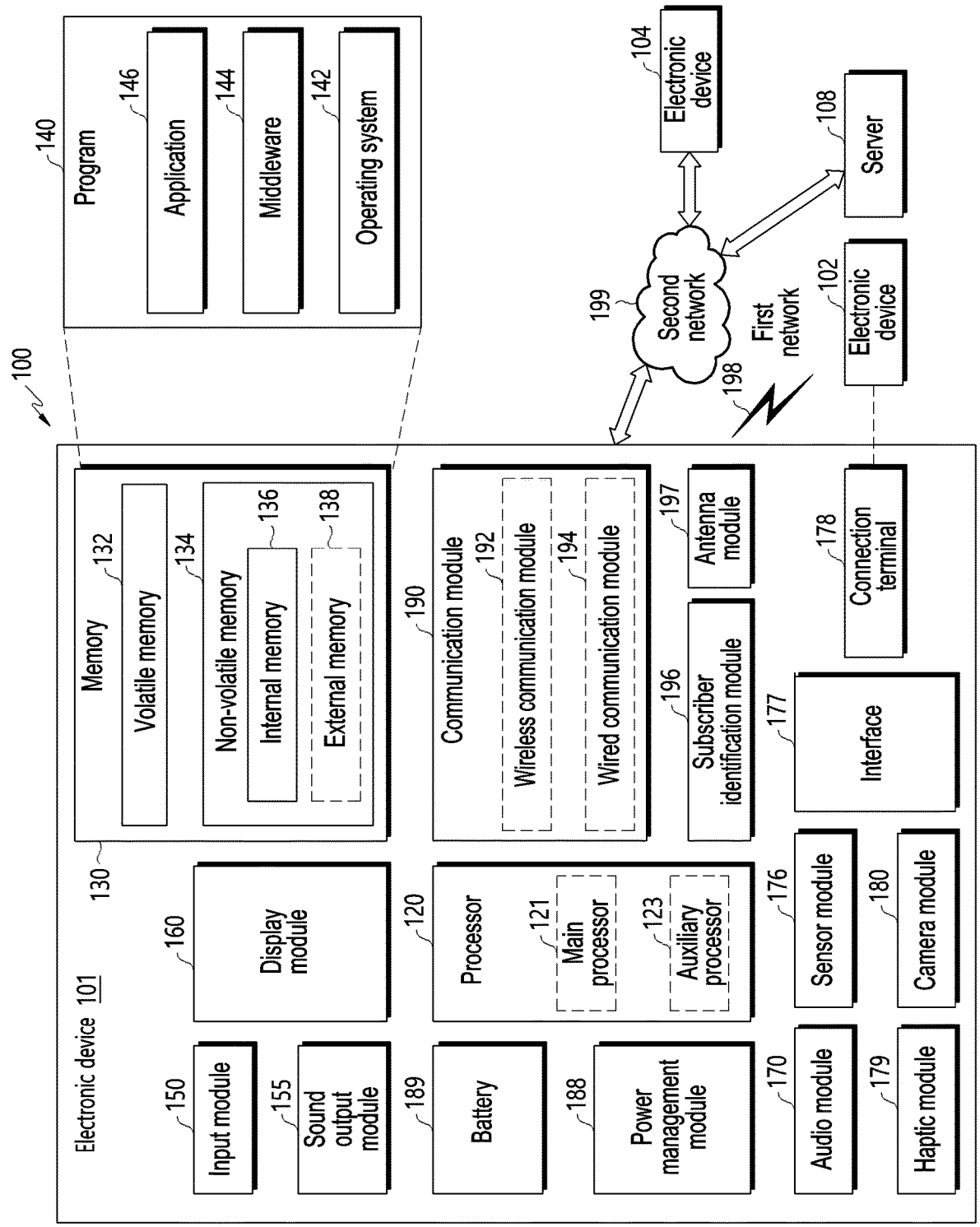
FIG. 1 is a block diagram of an electronic device in a network environment, according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
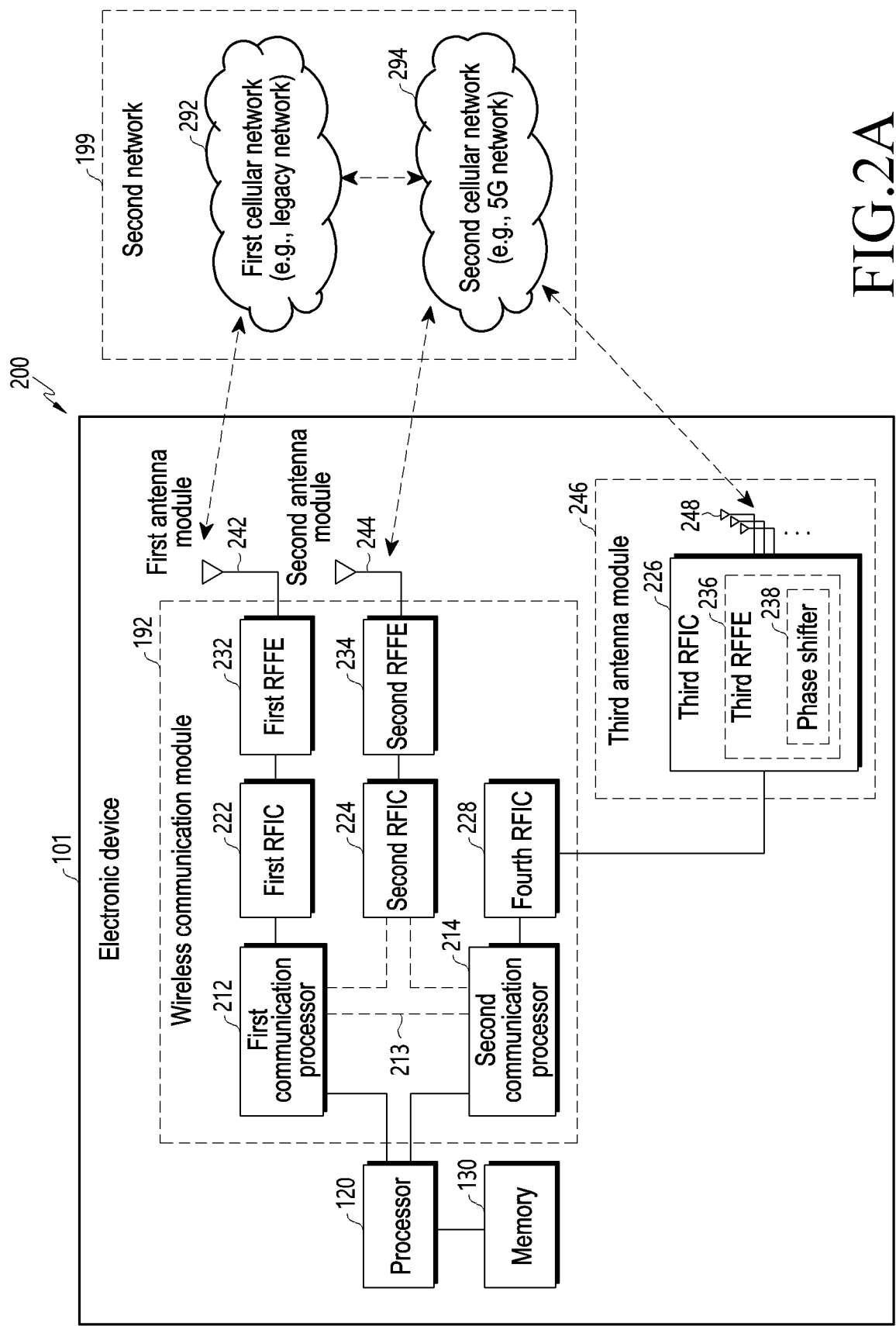
FIG. 2A is a block diagram of an electronic device for supporting legacy network communication and 5G network communication, according to an embodiment of the disclosure.

FIG. 2A is a block diagram 200 of an electronic device 101 for supporting legacy network communication and 5G network communication according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246 and antennas 248. The electronic device 101 may further include a processor 120 and a memory 130. A second network 199 may include a first cellular network 292 and a second cellular network 294. According to another embodiment, the electronic device 101 may further include at least one component among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or may be included as a part of the third RFIC 226.

The first communication processor 212 may support establishment of a communication channel of a band to be used for wireless communication with the first cellular network 292, and legacy network communication through the established communication channel According to various embodiments, the first cellular network may be a legacy network including a second generation (2G), 3G, 4G, or long-term evolution (LTE) network. The second communication processor 214 may support establishment of a communication channel corresponding to a designated band (e.g., about 6 GHz to about 60 GHz) among bands to be used for wireless communication with the second cellular network 294, and 5G network communication through an established communication channel According to various embodiments, the second cellular network 294 may be a 5G network defined by 3GPP. Additionally, according to an embodiment, the first communication processor 212 or the second communication processor 214 may support establishment of a communication channel corresponding to another designated band (e.g., about 6 GHz or less) among bands to be used for wireless communication with the second cellular network 294, and 5G network communication through an established communication channel.

The first communication processor 212 may transmit and receive data to and from the second communication processor 214. For example, data that has been classified to be transmitted through the second cellular network 294 may be changed to be transmitted through the first cellular network 292. In this case, the first communication processor 212 may receive transmission data from the second communication processor 214. For example, the first communication processor 212 may transmit and receive data with the second communication processor 214 through an inter-processor interface 213. The inter-processor interface 213 may be implemented as, for example, a universal asynchronous receiver/transmitter (UART), (e.g., high speed-UART (HS-UART) or a peripheral component interconnect bus express (PCIe) interface), but there is no limitation in the type thereof. Alternatively, the first communication processor 212 and the second communication processor 214 may exchange control information and packet data information using, for example, a shared memory. The first communication processor 212 may transmit and receive various information to and from the second communication processor 214, such as sensing information, information on output strength, and resource block (RB) allocation information.

Depending on the implementation, the first communication processor 212 may not be directly connected to the second communication processor 214. In this case, the first communication processor 212 may transmit and receive data with the second communication processor 214 through the processor 120 (e.g., an application processor). For example, the first communication processor 212 and the second communication processor 214 may transmit and receive data to and from the processor 120 (e.g., an application processor) through the HS-UART interface or the PCIe interface, but the type of interface is not limited. Alternatively, the first communication processor 212 and the second communication processor 214 may exchange control information and packet data information using a shared memory with the processor 120 (e.g., an application processor).

According to an embodiment, the first communication processor 212 and the second communication processor 214 may be configured in a single chip or a single package. According to various embodiments, the first communication processor 212 or the second communication processor 214 may be configured in a single chip or a single package with the processor 120, an auxiliary processor 123, or a communication module 190.

Figure 2B:
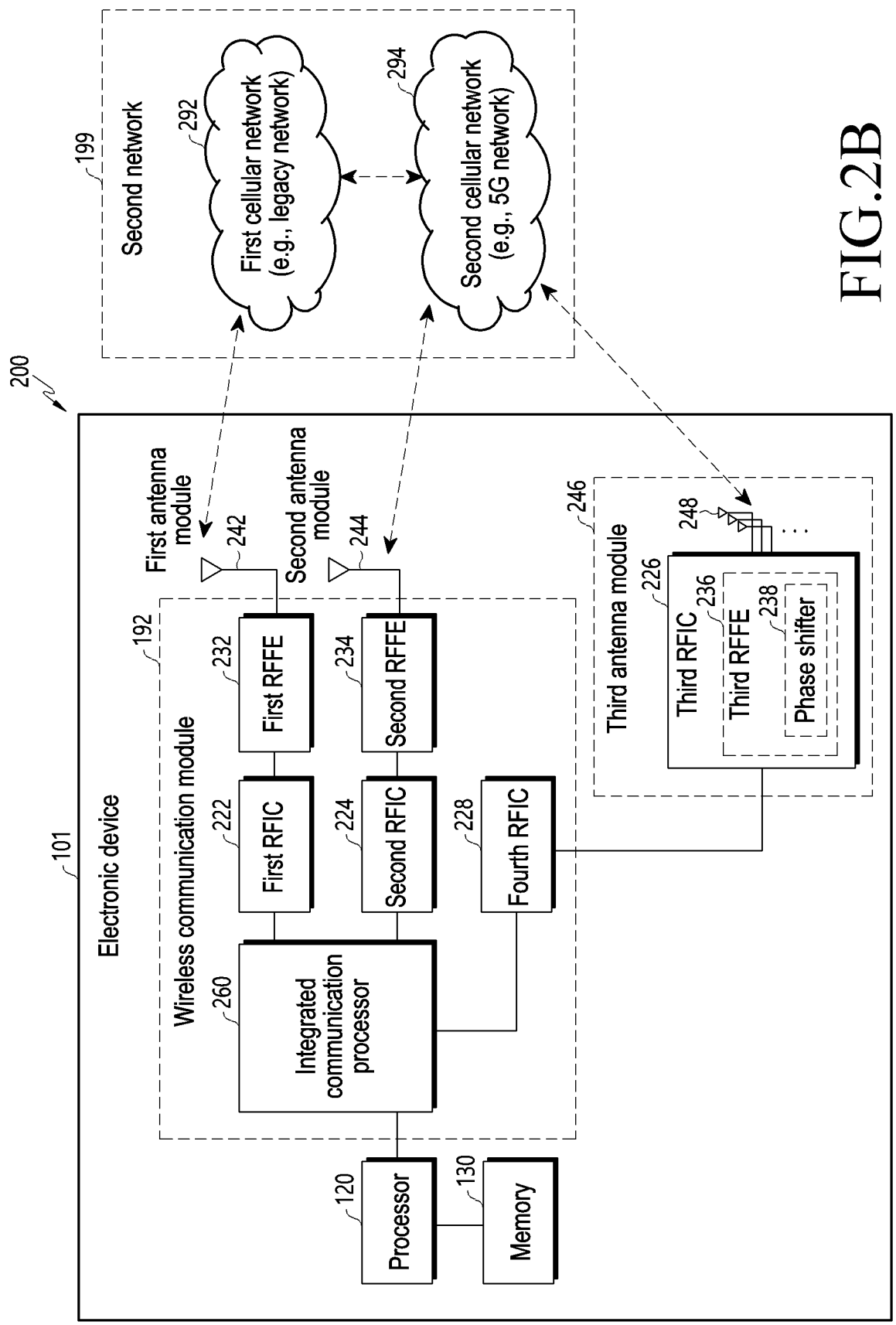
FIG. 2B is a block diagram of an electronic device for supporting legacy network communication and 5G network communication, according to an embodiment of the disclosure.

For example, referring to FIG. 2B, a unified communication processor 260 may support both functions for communication with the first cellular network 292 and the second cellular network 294.

The first RFIC 222 may, on transmission, convert the baseband signal generated by the first communication processor 212 into a radio frequency (RF) signal of about 700 MHz to about 3 GHz used in the first cellular network 292 (e.g., a legacy network). On reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal to be processed by the first communication processor 212.

The second RFIC 224 may, on transmission, convert the baseband signal generated by the first communication processor 212 or the second communication processor 214 into an RF signal (hereinafter, 5G Sub6 RF signal) of the Sub6 band (e.g., about 6 GHz or less) used for the second cellular network 294 (e.g., a 5G network). On reception, a 5G Sub6 RF signal may be obtained from the second cellular network 294 (e.g., 5G network) through an antenna (e.g., second antenna module 244), and may be preprocessed through an RFFE (e.g., the second RFFE 234). The second RFIC 224 may convert the preprocessed 5G Sub6 RF signal into a baseband signal to be processed by a corresponding one of the first communication processor 212 or the second communication processor 214.

The third RFIC 226 may convert the baseband signal generated by the second communication processor 214 into an RF signal (hereinafter, 5G Above6 RF signal) of the 5G Above6 band (e.g., about 6 GHz to about 60 GHz) to be used in the second cellular network 294 (e.g., a 5G network). On reception, a 5G Above6 RF signal may be obtained from the second cellular network 294 (e.g., 5G network) through an antenna (e.g., antennas 248), and may be preprocessed through a third RFFE 236. The third RFIC 226 may convert the preprocessed 5G Above6 RF signal into a baseband signal to be processed by the second communication processor 214. According to an embodiment, the third RFFE 236 may be configured as a part of the third RFIC 226.

According to an embodiment, the electronic device 101 may include the fourth RFIC 228 separately from or as at least a part of the third RFIC 226. In this case, the fourth RFIC 228 may convert the baseband signal generated by the second communication processor 214 into an RF signal (hereinafter, referred to as an IF signal) of an intermediate frequency band (e.g., about 9 GHz to about 11 GHz), and then transmit the IF signal to the third RFIC 226. The third RFIC 226 may convert the IF signal into a 5G Above6 RF signal. On reception, the 5G Above6 RF signal may be received from the second cellular network 294 (e.g., 5G network) through an antenna (e.g., antennas 248) and converted to an IF signal by the third RFIC 226. The fourth RFIC 228 may convert the IF signal into a baseband signal to be processed by the second communication processor 214.

According to an embodiment, the first RFIC 222 and the second RFIC 224 may be configured as at least a part of a single chip or a single package. According to various embodiments, when the first RFIC 222 and the second RFIC 224 in FIG. 2A or 2B are configured as a single chip or a single package, they may be configured as an integrated RFIC. In this case, the integrated RFIC may be connected to the first RFFE 232 and second RFFE 234 to convert a baseband signal into a signal of a band supported by the first RFFE 232 and/or second RFFE 234, and transmit the converted signal to one of the first RFFE 232 and the second RFFE 234. According to an embodiment, the first RFFE 232 and the second RFFE 234 may be configured as at least a part of a single chip or a single package. According to an embodiment, at least one antenna module of the first antenna module 242 or the second antenna module 244 may be omitted or may be combined with another antenna module to process RF signals of a plurality of corresponding bands.

According to an embodiment, the third RFIC 226 and the antennas 248 may be disposed on the same substrate to configure the third antenna module 246. For example, the wireless communication module 192 or the processor 120 may be disposed on the first substrate (e.g., main PCB). In this case, the third RFIC 226 may be disposed in a partial area (e.g., bottom) of the second substrate (e.g., sub PCB) separate from the first substrate, and the antennas 248 may be disposed in another partial area (e.g., top), thereby configuring the third antenna module 246. By disposing the third RFIC 226 and the antennas 248 on the same substrate, it is possible to reduce the length of the transmission line therebetween. This, for example, may reduce loss (e.g., attenuation) of a signal in a high-frequency band (e.g., about 6 GHz to about 60 GHz) used for 5G network communication by the transmission line. Accordingly, the electronic device 101 may improve the quality or speed of communication with the second cellular network 294 (e.g., a 5G network).

According to an embodiment, the antennas 248 may be configured as an antenna array including a plurality of antenna elements that may be used for beamforming. In this case, the third RFIC 226 may include, for example, as part of the third RFFE 236, a plurality of phase shifters 238 corresponding to a plurality of antenna elements. On transmission, each of the plurality of phase shifters 238 may convert the phase of a 5G Above6 RF signal to be transmitted to the outside (e.g., a base station of a 5G network) of the electronic device 101 through a corresponding antenna element. On reception, each of the plurality of phase shifters 238 may convert the phase of the 5G Above6 RF signal received from the outside through a corresponding antenna element into the same or substantially the same phase. This enables transmission or reception through beamforming between the electronic device 101 and the outside.

The second cellular network 294 (e.g., 5G networks) may operate independently (e.g., Stand Alone (SA)) of the first cellular network 292 (e.g., legacy networks) or may be connected and operated (e.g., Non-Stand Alone (NSA)). For example, a 5G network may have only an access network (e.g., a 5G radio access network (RAN) or a next generation RAN (NG RAN)), and may not have a core network (e.g., a next generation core (NGC)). In this case, after accessing the access network of the 5G network, the electronic device 101 may access an external network (e.g., the Internet) under the control of a core network (e.g., evolved packed core (EPC)) of the legacy network. Protocol information (e.g., LTE protocol information) for communication with a legacy network or protocol information (e.g., New Radio (NR) protocol information) for communication with a 5G network is stored in the memory 130 and may be accessed by other components (e.g., the processor 120, the first communication processor 212, or the second communication processor 214).

Hereinafter, methods for receiving system information in an electronic device will be described. At least some of the methods for receiving system information to be described later may follow the content included in the standard document 3rd generation partnership project (3GPP) technical specification (TS) 36.213, 36.331, 38.213, or 38.331, but is not limited thereto. The term "system information" used in the following description is not limited to a specific technology or a specific type of system information, and as an example, a master information block (MIB) and/or a system information block (SIB) will be described as an example.

According to various embodiments, the electronic device may synchronize with a cell (or base station) through a configured cell search procedure, obtain a physical layer ID (physical ID), and find cell frame synchronization. When the electronic device synchronizes with a cell, the electronic device may obtain system information of the corresponding cell, and at least a part of the system information of the cell may be repeatedly broadcast by the network. The system information of the cell may include downlink and uplink cell bandwidth, downlink and uplink configuration in case of time division duplexing (TDD), detailed parameters related to random access, or uplink power control information.

According to various embodiments, the system information may be transmitted in different ways through different channels. For example, system information referred to as MIB may be transmitted using a broadcast channel (BCH). A main part of a plurality of different system information referred to as SIB may be transmitted using a downlink-shared channel (DL-SCH). For example, the presence or absence of system information on the DL-SCH in the subframe may be identified by a corresponding physical downlink control channel (PDCCH) marked as a specific system information radio network temporary identifier (RNTI) (SI-RNTI). The corresponding PDCCH may include information on a transmission format and physical resources (e.g., resource blocks) used for system information.

According to various embodiments, the SIB in the LTE communication system may include the following types of system information. At least a part of the content related to the SIB of the LTE communication system to be described later may be included in the same or similar manner in the 5G communication system.

- SIB1: may include related information depending on whether the electronic device can use the corresponding cell. For example, operator information of the corresponding cell, and information related to restrictions on access by a specific user to the corresponding cell may be included. When configured to TDD, information on subframe allocation for downlink/uplink and configuration of a specific frame may be included. Information (hereinafter, referred to as "system information (SI) scheduling information") on scheduling in the time domain of other SIBs other than SIB1 (e.g., SIB2, SIB3, . . . SIB20) may be included.
- SIB2: may include information necessary for the electronic device to access the corresponding cell. For example, uplink cell bandwidth, random access parameters, information on parameters related to uplink power control, information related to access restrictions for the corresponding cell, and multicast broadcast single frequency network (MBSFN) configuration information may be included.
- SIB3: may include information related to cell-reselection.
- SIB4 to SIB8: may include information of a neighboring cell (intra frequency neighbor cell) on the same carrier as the corresponding cell, a neighboring cell (inter frequency neighbor cell) on another carrier, and a neighboring cell (e.g., WCDMA/HSPA, GSM, CDMA2000 cell) other than the LTE cell.
- SIB9: may include the name of the home eNodeB.
- SIB10 to SIB12: may include a public warning message (e.g., earthquake and tsunami warning system (ETWS), commercial mobile alert service (CMAS) information).
- SIB13: may include information necessary for the multimedia broadcast multicast services (MBMS) reception.
- SIB14: may be used to support enhanced access barring, and may include information necessary for controlling an electronic device to access a cell.
- SIB15: may include information necessary for MBMS reception of adjacent carrier frequencies.
- SIB16: may include global positioning system (GPS) time and coordinated universal time (UTC) related information.
- SIB17: may include information on interworking between LTE and WLAN.
- SIB18, SIB19: may include information on sidelink for direct communication between electronic devices.
- SIB20: may include information related to single-cell point-to-multipoint.

The base station may not transmit at least some of the SIBs as necessary. For example, SIB9 may not be transmitted when a user builds a home eNodeB, and SIB13 may not be transmitted when MBMS service is not provided. The MIB or at least some of the SIBs may be repeatedly broadcast according to a set period. How often a specific SIB is transmitted may vary depending on how quickly the electronic device obtains corresponding system information when entering a cell. For example, a lower-numbered SIB may be configured to be transmitted more frequently as more time-sensitive information than a higher-numbered SIB. For example, SIB1 may be transmitted every 80 ms, and the transmission period of SIBs having a higher number than SIB1 (e.g., SIB2 to SIB20) may be variously set with a relatively longer time interval. For example, the transmission period of SIB2 may be 160 ms, the transmission period of SIB3, SIB4, or SIB5 may be set to 320 ms, and the transmission period of SIB6, SIB7, or SIB8 may be set to 640 ms. The transmission period of the SIBs may be variously changed and set by a network operator.

According to various embodiments, different SIBs may be mapped to different SI (system information) messages corresponding to actual transmission blocks transmitted on the DL-SCH. For example, SIB1 may be mapped to SI-1, which is the first SI message, and the remaining SIBs may be multiplexed by grouping the remaining SIBs into the same SI under specific constraints. For example, SIB2 may be mapped to SI-2, SIB3 and SIB4 may be mapped to SI-3, SIB5 may be mapped to SI-4, and SIB6, SIB7, and SIB8 may be mapped to SI-5. The mapping relationship between the SIB and the SI may be different for each network, and may be different from each other even within the same network.

According to various embodiments, different SIs may have different transmission periods. In the following description, the transmission period of each SI may be referred to as an "SI period". Each SI may be transmitted in any slot or subframe within a time window having a predefined start point and duration, and in the following description, the time window in which the SI may be transmitted may be referred to as an "SI window". The start point and duration of the time window for each SI may be provided through SIB1. Each SI may be transmitted on a continuous slot or subframe within a corresponding SI window, or may be transmitted on a discontinuous subframe. Whether system information exists within the configured SI window may be identified by the SI-RNTI on the PDCCH as described above. The PDCCH may provide scheduling information in the frequency domain along with other parameters related to system information transmission. According to various embodiments, different time windows that do not overlap with each other may be allocated to different SIs. Even if the electronic device fails to identify the identifier for each SI, the electronic device may identify which SI is received through the corresponding time window. According to various embodiments, the electronic device supporting carrier aggregation (CA) may identify system information on a secondary component carrier (SCC) from system information on a primary component carrier (PCC).

As a comparative example of the system information of the LTE communication system, the system information of the 5G communication system may be configured as follows. In the 5G communication system, the MIB may be transmitted through a PBCH, and the PBCH may be transmitted by forming a synchronization signal (SS) block together with a primary synchronization sequence (PSS) and secondary synchronization (SSS). The PBCH in the SS block may include a numerology of SIB1 and a configuration of SIB1 in relation to SIB1. The MIB transmitted through the PBCH may be configured as illustrated in Table 1 below, but is not limited thereto.

TABLE 1

```
MIB ::= SEQUENCE {
    systemFrameNumber          BIT STRING (SIZE (6)),
    subCarrierSpacingCommon       ENUMERATED {scs15or60, scs30or120},
    ssb-SubcarrierOffset       INTEGER (0..15),
    dmrs-TypeA-Position           ENUMERATED {pos2, pos3},
    pdcch-ConfigSIB1           INTEGER (0..255),
    cellBarred                 ENUMERATED {barred, notBarred},
    intraFreqReselection          ENUMERATED {allowed, notAllowed},
    spare                      BIT STRING (SIZE (1))
}
```

Referring to Table 1, the MIB may include a system frame number (SFN), SIB1, subcarrier spacing of message 2 or 4 of random access, SSB subcarrier offset, location information of downlink demodulation reference signal (DMRS), PDCCH configuration information of SIB1, cell restriction, or whether intra-frequency reselection is allowed.

According to various embodiments, the numerology of SIB1 may include information on subcarrier spacing used for transmission of SIB1. According to various embodiments, the numerology of SIB1 may be equally used for message 2 (Msg 2) and message 4 (Msg 4) in the random access procedure. The configuration of SIB1 may include information (e.g., PDCCH/SIB bandwidth, CORESET, common search space, PDCCH parameters) on parameters related to PDCCH required to monitor cell search and scheduling of SIB1.

According to various embodiments, SIB1 may be referred to as remaining minimum system information (RMSI) and may include system information necessary for the electronic device to access the system. The SIB1 may be periodically broadcast for the entire cell area. The SIB1 may include information necessary for initial random access. For example, SIB1 may be transmitted by a physical downlink shared channel (PDSCH) scheduled at a period of 160 ms. The PBCH/MIB may include a search space used for scheduling of SIB1 and a control resource set (CORESET) corresponding thereto together with information on the numerology used for transmission of SIB1. In the CORESET, the electronic device may monitor scheduling of SIB1 indicated by SI-RNTI.

According to various embodiments, SIBs other than SIB1 may include system information that the electronic device does not need to know before accessing a cell, and similarly to SIB1, may be periodically broadcast or may be transmitted only when necessary. For example, SIBs other than SIB1 may be transmitted at the request of at least one electronic device in the corresponding cell. By transmitting SIBs other than SIB1 at the request of the electronic device, it is possible to prevent unnecessary periodic transmission of SIBs to cells that are not currently camped by the electronic device, and it is possible to increase network efficiency. When the electronic device requests specific system information from the network without always broadcasting the SIBs, a method of providing the corresponding system information (e.g., the corresponding SIB) may be referred to as an "on-demand method". For example, other SIBs other than MIB and system information block 1 (SIB1), which are essential system information, may be provided in a broadcasting method or an on-demand method according to configuration. If normal reception fails after a system information request (hereinafter referred to as "system information request (SI request)") in the on-demand method, the electronic device may retransmit the system information request. Compared to the above-described LTE communication system, SIBs in the 5G communication system may include the following types of system information.

SIB1: may be transmitted through the DL-SCH, and, for example, may be transmitted at a period of 160 ms. SIB1 may include availability of other SIBs and scheduling related information (e.g., periodicity, SI window size). SIB1 may include information indicating whether other SIBs are periodically broadcast or transmitted in the on-demand method. SIB1 may include information for the electronic device to perform an SI request.

SIB2: may include information related to cell-reselection.

SIB3: may include information related to neighboring cell on the same carrier in the NR and information related to cell-reselection.

SIB4: may include information related to neighboring cell information on other carriers in the NR and cell-reselection.

SIB5: may include LTE neighbor cell information and information related to cell-reselection.

SIB6 to SIB8: may include a public warning message (e.g., earthquake and tsunami warning system (ETWS), commercial mobile alert service (CMAS) information).

SIB9: may include GPS time information and UTC (coordinated universal time) related information.

According to various embodiments, the SIBs in the 5G communication system may further include other system information (e.g., system information required for MBMS reception) in addition to the SIB1 to SIB9.

Hereinafter, methods for receiving system information in an electronic device will be described with reference to FIGS. 3 to 10.

Figure 3:
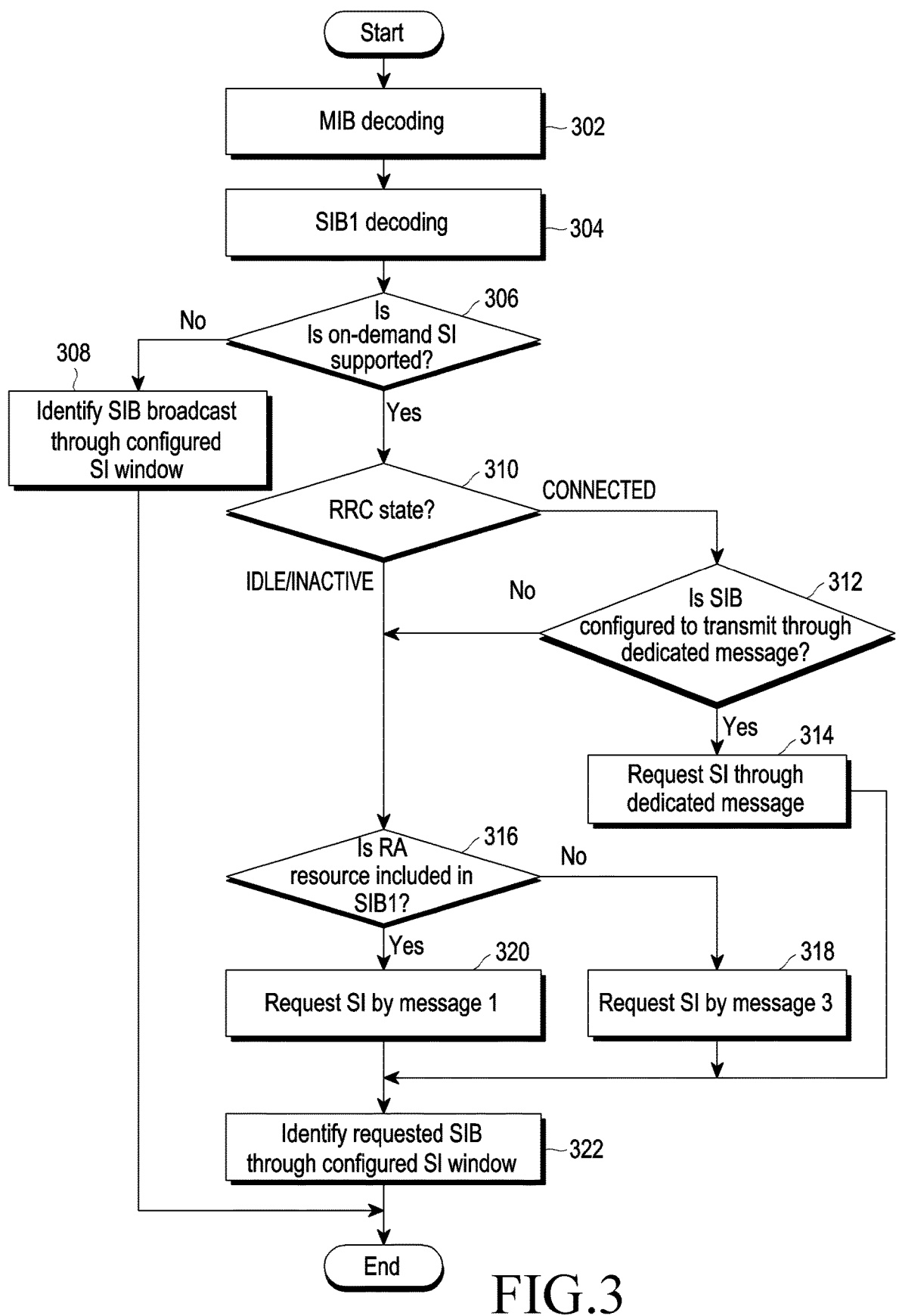
FIG. 3 illustrates a flowchart illustrating a method of receiving system information in an electronic device according to an embodiment of the disclosure.

FIG. 3 illustrates a flowchart illustrating a method of receiving system information in an electronic device according to an embodiment of the disclosure. According to various embodiments, the electronic device (e.g., the electronic device 101 of FIG. 1) may synchronize with a cell (or a base station) through a configured cell search procedure, obtain a physical layer ID (physical ID), and find cell frame synchronization. When the electronic device synchronizes with a cell, the electronic device may obtain system information of the corresponding cell, and the system information of the cell may be repeatedly broadcast by the network. The system information of the cell may include downlink and uplink cell bandwidth, downlink/uplink configuration in case of time division duplexing (TDD), detailed parameters related to random access, or uplink power control information.

Referring to FIG. 3, according to various embodiments, the electronic device (e.g., the electronic device 101 of FIG. 1) (e.g., the wireless communication module 192, the first communication processor 212, the second communication processor 214, and the unified communication processor 260) may decode the MIB in operation 302. For example, as described in Table 1, the MIB may include a system frame number (SFN), SIB1, subcarrier spacing of message 2 or 4 of random access, SSB subcarrier offset, location information of downlink demodulation reference signal (DMRS), PDCCH configuration information of SIB1, cell-restriction, or whether intra-frequency reselection is allowed.

According to various embodiments, the numerology of SIB1 may include information on subcarrier spacing used for transmission of SIB1. According to various embodiments, the numerology of SIB1 may be equally used for message 2 (Msg 2) and message 4 (Msg 4) in the random access procedure. The configuration of SIB1 may include information (e.g., PDCCH/SIB bandwidth, CORESET, common search space, and PDCCH parameters) on parameters related to PDCCH required to monitor cell search and scheduling of SIB1.

According to various embodiments, in operation 304, the electronic device may decode SIB1 based on information included in the MIB. As described above, the SIB1 may be referred to as remaining minimum system information (RMSI) and may include system information necessary for the electronic device to access the system. The SIB1 may be periodically broadcast for the entire cell area. The SIB1 may include information necessary for initial random access. For example, SIB1 may be transmitted by a physical downlink shared channel (PDSCH) scheduled at a period of 160 ms. The PBCH/MIB may include a search space used for scheduling of SIB1 and a control resource set (CORESET) corresponding thereto together with information on the numerology used for transmission of SIB1. In the CORESET, the electronic device may monitor scheduling of SIB1 indicated by SI-RNTI.

According to various embodiments, SIBs other than SIB1 may include system information that the electronic device does not need to know before accessing a cell, and similarly to SIB1, may be periodically broadcast or may be transmitted only when necessary. For example, SIBs other than SIB1 may be transmitted at the request of at least one electronic device in the corresponding cell. When the electronic device requests specific system information from the network without always broadcasting the SIBs, a method of providing the corresponding system information (e.g., the corresponding SIB) may be referred to as an "on-demand method". For example, other SIBs other than MIB and system information block 1 (SIB1), which are essential system information, may be provided in an on-demand method according to configuration.

According to various embodiments, in operation 306, the electronic device may identify whether on-demand for system information is supported through the SIB1. For example, whether the on-demand is supported may be identified through information included in SIB1 of Table 2 below.

TABLE 2

```
message c1 : systemInformationBlockType1 :
si-SchedulingInfo
{
  schedulingInfoList
  {
    {
      si-BroadcastStatus broadcasting, // sib2 is broadcast
      si-Periodicity rf32,
      sib-MappingInfo
      {
        {
          type sibType2,
          value Tag 0
        }
```

TABLE 2-continued

```
      }
    },
    {
      si-BroadcastStatus notBroadcasting, // sib3 uses on-demand
      si-Periodicity rf64,
      sib-MappingInfo
      {
        {
          type sibType3,
          value Tag 1
        }
      }
    }
  },
```

Referring to Table 2, when the broadcast status information (si-BroadcastStatus) of a specific SIB in the system information (SI) scheduling information (si-SchedulingInfo) in SIB1 is configured to "broadcasting", the corresponding SIB may be broadcast, and when "not Broadcasting" is configured, the corresponding SIB may be provided by the electronic device requesting the corresponding SIB through an on-demand method. For example, in Table 2, it may be confirmed that SIB2 is configured as a broadcast SIB, and it may be confirmed that SIB3 is configured as a non-broadcast SIB (e.g., SIB provided by on-demand method). According to various embodiments, according to Table 2, the SI period (si-Periodicity) of SIB2 may be set to 320 ms, and the SI period of SIB3 may be set to 640 ms.

According to various embodiments, if it is determined that the specific SIB is configured as the broadcast SIB and does not support on-demand SI (operation 306—No) in operation 306, the electronic device may identify the broadcast SIB through the preset SI window in operation 308. Hereinafter, a method of identifying the broadcast SIB in an electronic device will be described with reference to FIGS. 4 and 5.

Figure 4:
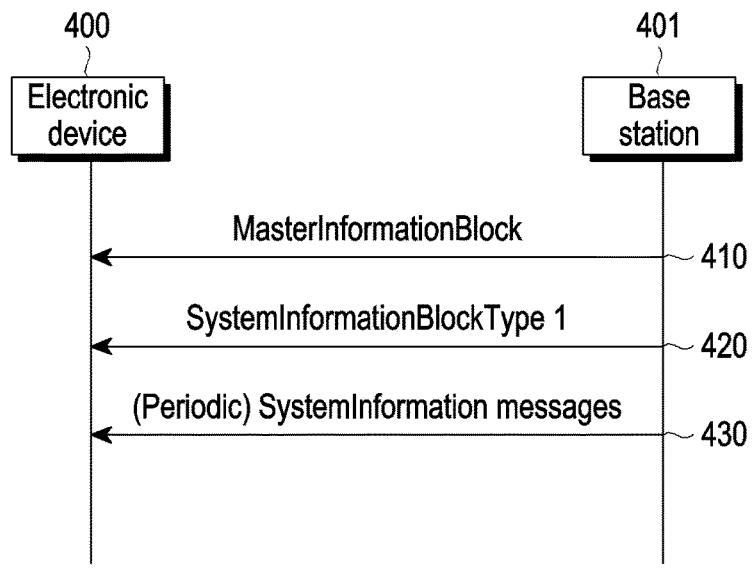
FIG. 4 illustrates a signal flowchart illustrating a method of receiving system information from a base station in an electronic device according to an embodiment of the disclosure.
Figure 5:
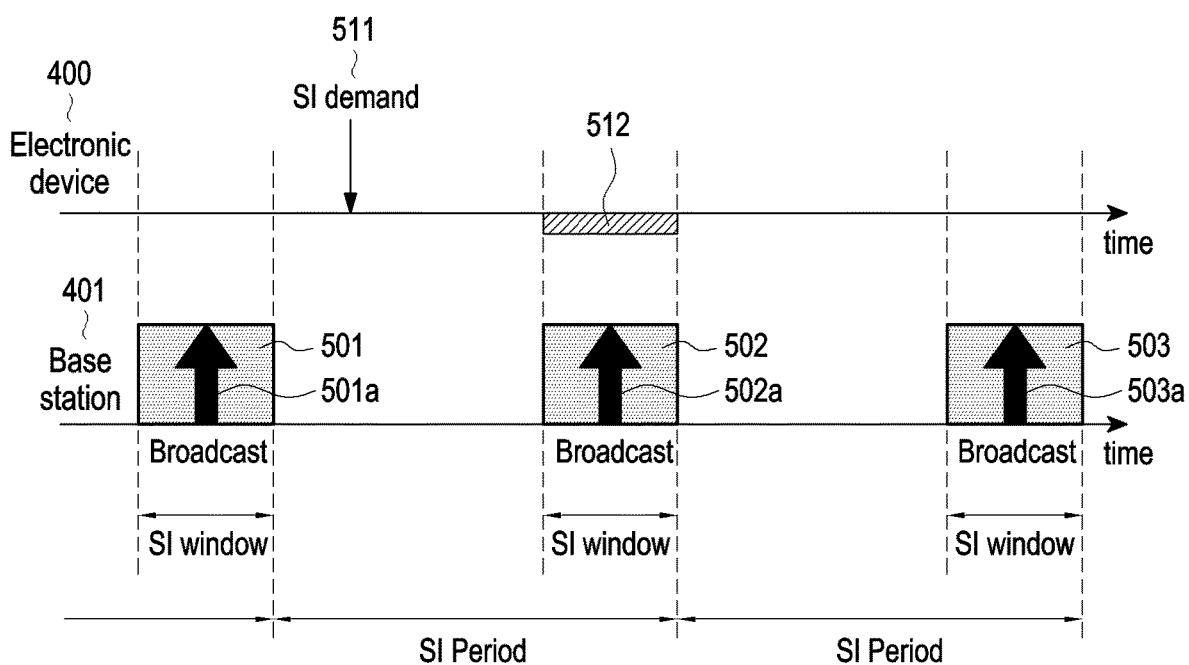
FIG. 5 is a diagram illustrating timing at which a base station transmits system information according to an embodiment of the disclosure.

FIG. 4 illustrates a signal flowchart illustrating a method of receiving system information from a base station in an electronic device according to an embodiment of the disclosure, and FIG. 5 is a diagram illustrating timing at which a base station transmits system information according to an embodiment of the disclosure.

Referring to FIGS. 4 and 5, the electronic device 400 (user equipment (UE)) (e.g., electronic device 101 of FIG. 1) may receive and decode the MIB from the base station 401 (e.g., eNB or gNB) in operation 410. The electronic device 400 may receive and decode SIB1 in operation 420 with reference to information included in the received MIB. The electronic device 400 may receive other SIBs (e.g., SIB2, SIB3, . . . , or SIB20) periodically transmitted with reference to information included in the received SIB1 in operation 430.

Referring to FIG. 5, a specific SIB broadcast by the base station 401 may be broadcast within an SI window every SI period set as illustrated. According to various embodiments, as described above, at least one SIB may be grouped into one SI message and multiplexed, and the SI period and the SI window may be identically configured for each SI message, but is not limited thereto. In the following description, for convenience of description, it will be described that a specific SI message or a specific SIB is transmitted within one SI window. For example, the base station 401 may transmit the corresponding SIB 501a within the first SI window 501 period in the first SI period, and may transmit the corresponding SIB 502a within the second SI window 502 period in the second SI period, and may transmit the corresponding SIB 503*a* within the third SI window 503 period in the third SI period. As described above, the SI period and/or the SI window may be configured for each SIB or for each SI message mapped to each SIB. For example, the SI period may be set to 320 ms (32 radio frames (RF)), and the size of the SI window may be set to 80 slots (e.g., 40 ms when SCS is 30 kHz). Information on the SI period and/or SI window may be transmitted by being included in SIB1 as illustrated above in Table 2 and Table 3 below.

is generated when the SIB1 message initially received is stored and then SI configuration information is changed.

According to the demand for the SI 511, the electronic device 400 may monitor 512 the corresponding SI or the corresponding SIB 502*a* transmitted through the SI window 502 within the corresponding SI period in which the at least one SIB is broadcast or the second arriving SI window 502. As a result of the monitoring, when the corresponding SIB 502*a* is not decoded (e.g., when decoding of the correspond-

TABLE 3

```
SIB1 ::= SEQUENCE {
...
    si-SchedulingInfo    SI-SchedulingInfo    OPTIONAL,         -- Need R
    servingCellConfigCommon   ServingCellConfigCommonSIB             OPTIONAL,
-- Need R
...
ServingCellConfigCommonSIB ::=            SEQUENCE {
    downlinkConfigCommon            DownlinkConfigCommonSIB,
    uplinkConfigCommon              UplinkConfigCommonSIB         OPTIONAL,   --
Need R
    supplementaryUplink            UplinkConfigCommonSIB          OPTIONAL,   --
Need R
    n-TimingAdvanceOffset           ENUMERATED         {   n0,     n25560,
n39936 } OPTIONAL, -- Need S
    ssb-PositionsInBurst          SEQUENCE {
        inOneGroup                BIT STRING (SIZE (8)),
        groupPresence                        BIT          STRING                (SIZE
(8))                    OPTIONAL -- Cond Above6GHzOnly
    },
...
DownlinkConfigCommonSIB ::=     SEQUENCE {
    frequencyInfoDL               FrequencyInfoDL-SIB,
    initialDownlinkBWP              BWP-DownlinkCommon,
    bcch-Config                   BCCH-Config,
    pcch-Config                   PCCH-Config,
    ...
}
...
BWP-DownlinkCommon ::=         SEQUENCE {
    genericParameters BWP,
    pdcch-ConfigCommon SetupRelease { PDCCH-ConfigCommon }
    pdsch-ConfigCommon SetupRelease { PDSCH-ConfigCommon }
    ...
}
...
PDCCH-ConfigCommon ::=                  SEQUENCE {
    commonControlResourcesSets   SEQUENCE        (SIZE(1..2))                OF
ControlResourceSet,
    commonSearchSpaces                 SEQUENCE (SIZE(1..4)) OF SearchSpace,
    searchSpaceSIB1    SearchSpaceId           OPTIONAL,
    searchSpaceOtherSystemInformation       SearchSpaceId               OPTIONAL,
    pagingSearchSpace                  SearchSpaceId               OPTIONAL,
    ra-ControlResourceSet                  ControlResourceSetId         OPTIONAL,
    ra-SearchSpace                     SearchSpaceId               OPTIONAL,
    ...
}
```

For example, referring to Table 3, SIB1 may include location information (e.g., search space information) of other SIBs other than SIB1 in the serving cell configuration common SIB information (ServingCellConfigCommonSIB).

Referring again to FIG. 5, when the electronic device 400, after decoding SIB1, identifies at least one SIB configured to be broadcast, the electronic device 400 may identify the SI period and SI window of the corresponding SIB by using the information included in Table 3. In this disclosure, a situation in which the electronic device requires an SIB other than SIB1 will be referred to as "SI demand". For example, the electronic device 400 may identify at least one SIB being broadcast through SIB1 and determine that a demand for the corresponding SI 511 has occurred. According to various embodiments, it may be determined that the demand for SI ing SIB fails), the corresponding SI or the corresponding SIB 503*a* transmitted through the SI window 503 within the next SI period may be monitored.

Referring again to FIG. 3, according to various embodiments, when it is confirmed in operation 306 that a specific SIB is configured to a non-broadcast SIB and supports on-demand SI (operation 306—Yes), the electronic device 101 may obtain the SI or SIB by transmitting the SI request corresponding SI or SIB to the base station according to an on-demand method.

Figure 6:
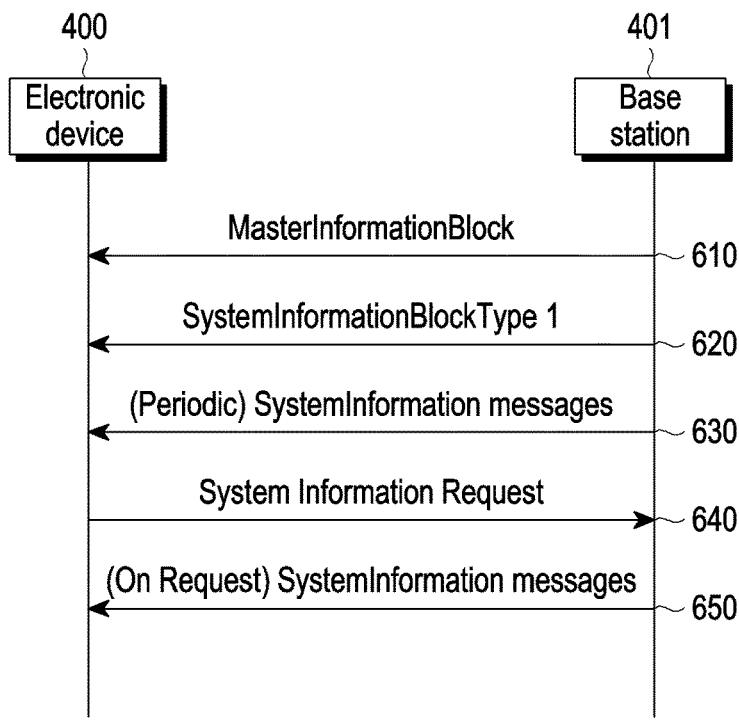
FIG. 6 illustrates a signal flowchart illustrating a method of receiving system information from a base station in an electronic device according to an embodiment of the disclosure.

FIG. 6 illustrates a signal flowchart illustrating a method of receiving system information from a base station in an electronic device according to an embodiment of the disclosure.

Referring to FIG. 6, the electronic device 400 may receive and decode the MIB from the base station 401 (e.g., gNB)

in operation 610. The electronic device 400 may decode SIB1 transmitted from the base station 401 by using the information included in the MIB in operation 620. According to various embodiments, the electronic device 400 may decode the remaining SIBs periodically broadcast by the base station in operation 630. Because operations 610 to 630 are the same as or similar to operations 410 to 430 of FIG. 4 described above, a detailed description thereof will be omitted.

According to various embodiments, the electronic device 400 may transmit an SI request to the base station 401 in operation 640 for the counter SIB configured as the non-broadcast SIB configured in SIB1. The base station 401 may transmit the SI or SIB corresponding to the transmitted SI request to the electronic device 400. Detailed procedures of operations 640 and 650 will be described later in detail with reference to FIGS. 7 to 10.

According to various embodiments, the electronic device 101 may transmit the SI request in different ways according to the RRC state. According to various embodiments, the electronic device 101 may identify the RRC state in operation 310. As a result of the identification in operation 310, when the RRC state is confirmed to be the RRC_CONNECTED state (operation 310—CONNECTED), the electronic device 101 may identify whether each SIB is an SIB configured to transmit an SI request through a dedicated message in operation 312. For example, SIB12, SIB13, or SIB14 may be a SIB configured to transmit an SI request through a dedicated message. At least one SIB (e.g., SIB2, SIB3, SIB4, and SIB5) other than the SIB configured to transmit the SI request through the dedicated message may transmit the SI request through the RACH.

According to various embodiments, if it is the SIB configured to transmit the SI request through a dedicated message as a result of the identification in operation 312 (operation 312—Yes), the electronic device 101 may transmit the SI request to the base station through a dedicated message in operation 314. For example, the dedicated message for the SI request may include a "DedicatedSIBRequest" message included in the standard document 3 GPP TS 38.331, but is not limited thereto. According to various embodiments, the "DedicatedSIBRequest" message may include a requested SIB list (requestedSIB-List) on the on-demand SIB request list (onDemandSIB-RequestList) to indicate the SIB to be requested. As a result of the identification in operation 312, if it is not the SIB configured to transmit the SI request through the dedicated message (operation 312—No), the electronic device 101 may transmit the SI request to the base station through message 1 or message 3 of the random access (RA) message according to whether the random access resource (RA resource) is included in SIB1 as described in operation 316 and later.

As a result of the identification in operation 310, if the RRC state is confirmed to be RRC_IDLE or RRC_INACTIVE (operation 310—IDLE/INACTIVE), the electronic device 101 may transmit the SI request to the base station through message 1 or message 3 of the random access (RA) message according to whether the random access resource (RA resource) is included in SIB1 as described later. According to various embodiments, as a result of the identification in operation 310, if the RRC state is confirmed to be RRC_IDLE or RRC_INACTIVE (operation 310—IDLE), the electronic device 101 may identify whether the RA resource is included in SIB1 in operation 316. As a result of the identification in operation 316, if the RA resource is included in SIB1 (operation 316—Yes), the electronic device 101 may transmit the SI request to the base station by message 1 (Msg1) among messages corresponding to the random access procedure in operation 320. As a result of the identification in operation 316, if the RA resource is not included in SIB1 (operation 316—No), the electronic device 101 may transmit the SI request to the base station by message 3 (Msg3) among messages corresponding to the random access procedure in operation 318. According to various embodiments, the base station receiving the SI request transmitted by message 1 or message 3 among the messages corresponding to the random access procedure may transmit the corresponding SI or the corresponding SIB through the corresponding SI window of the corresponding SI period. The electronic device 101 may identify the requested SI or SIB through the SI window configured in operation 322.

Hereinafter, a method of transmitting an SI request using a message corresponding to a random access procedure in an electronic device and identifying the corresponding SI or SIB in the electronic device will be described with reference to FIGS. 7, 8, 9 and 10.

For example, the electronic device 101 may transmit an SI request for the corresponding SIB to the base station 401 through message 1 (Msg1) or message 3 (Msg3) among messages included in the random access procedure. The random access procedure may consist of 4 steps or 2 steps. For example, as a first step of the random access procedure, the electronic device may transmit a preamble referred to as a physical random access channel (PRACH) to the base station. As a second step of the random access procedure, the base station may transmit a random access response (RA response; RAR) to the electronic device in response to the transmission of the PRACH. The RAR indicates normal reception of the preamble, and may include a timing-alignment command for adjusting the transmission timing of the UE based on the timing of the preamble received from the electronic device. As a third step of the random access procedure, the electronic device transmits message 3 (Msg3) to the base station, and the base station transmits message 4 (Msg4) to the electronic device, thereby ending the random access procedure. When transmitting the message 3, the electronic device may transmit a necessary message using an uplink-shared channel (UL-SCH) resource allocated in the RAR.

When the random access procedure is normally completed, the electronic device may be switched to an RRC_CONNECTED state. The random access procedure may be performed when the electronic device initially accesses the cell, and may also be used when handover to another cell, when uplink synchronization is lost, and when uplink scheduling is requested because there is no configuration of a scheduling request resource exclusively allocated to the electronic device.

According to various embodiments, as described above, in operation 316, the electronic device 101 may identify whether a random access resource (RA resource) is included in SIB1. For example, the RA resource included in SIB1 may be configured to be included in SI scheduling information (SI-SchedulingInfo) as illustrated in Table 4 below.

TABLE 4

```
SI-SchedulingInfo ::= SEQUENCE {
    schedulingInfoList        SEQUENCE (SIZE (1..maxSI-Message)) OF
SchedulingInfo,
    si-WindowLength    ENUMERATED {s5, s10, s20, s40, s80, s160, s320, s640,
s1280},
    si-RequestConfig            SI-RequestConfig OPTIONAL, -- Cond MSG-1
    si-RequestConfigSUL              SI-RequestConfig OPTIONAL, -- Cond SUL-
MSG-1
    systemInformationAreaID        BIT STRING (SIZE (24)) OPTIONAL, -- Need
R
...
}
SI-RequestConfig::= SEQUENCE {
    rach-OccasionsSI SEQUENCE {
        rach-ConfigSI              RACH-ConfigGeneric,
        ssb-perRACH-Occasion               ENUMERATED {oneEighth, oneFourth,
oneHalf, one, two, four, eight, sixteen}
    } OPTIONAL, -- Need R
    si-RequestPeriod            ENUMERATED {one, two, four, six, eight, ten,
twelve, sixteen} OPTIONAL,
    si-RequestResources        SEQUENCE(SIZE    (1..maxSI-Message))    OF    SI-
RequestResources
}
SI-RequestResources ::= SEQUENCE {
    ra-PreambleStartIndex          INTEGER (0..63),
    ra-AssociationPeriodIndex         INTEGER (0..15) OPTIONAL, -- Need R
    ra-ssb-OccasionMaskIndex          INTEGER (0..15) OPTIONAL -- Need R
}
```

For example, as illustrated in Table 4, the RA resource may be included in the SI scheduling information of SIB1. In Table 4, "rach-OccasionsSI" may indicate a random access occasion for a specific SI. For example, in order to transmit the SI request, the electronic device may transmit a random access preamble to the base station in a time interval corresponding to the random access occasion. The base station that has received the random access preamble transmitted in the time interval corresponding to the configured random access occasion may determine the received random access preamble as a corresponding SI or an SI request for the corresponding SIB by identifying a random access occasion corresponding to the time at which the random access preamble is received. For example, the RA resource may be included in the configuration information (si-RequestConfig) of the SI request as illustrated in Table 5 below.

TABLE 5

```
//NW -> UE : SIB1
    si-RequestConfig
    {
        rach-OccasionsSI
        {
            rach-ConfigSI
            {
                prach-ConfigurationIndex 160,
                msg1-FDM four,
                msg1-FrequencyStart 0,
                zeroCorrelationZoneConfig 15,
                preambleReceivedTargetPower -118,
                preambleTransMax n7,
                powerRampingStep dB4,
                ra-ResponseWindow sl20
            },
            ssb-perRACH-Occasion one
        },
        si-RequestPeriod two,
        si-RequestResources
        {
            {
```

TABLE 5-continued

```
                ra-PreambleStartIndex 52,
                ra-AssociationPeriodIndex 0,
                ra-ssb-OccasionMaskIndex 0
            }
        }
    },
```

Referring to Table 5, it can be seen that the PRACH configuration index (prach-configurationIndex) is set to 160 and the random access preamble start index (ra-PreambleStartIndex) is set to 52. The electronic device 101 may transmit the random access preamble to the corresponding time point and PRACH resource corresponding to the values exemplified in Table 5. The base station 401 may determine that the random access preamble is transmitted as a specific SI request by identifying when the random access preamble is transmitted.

Figure 7:
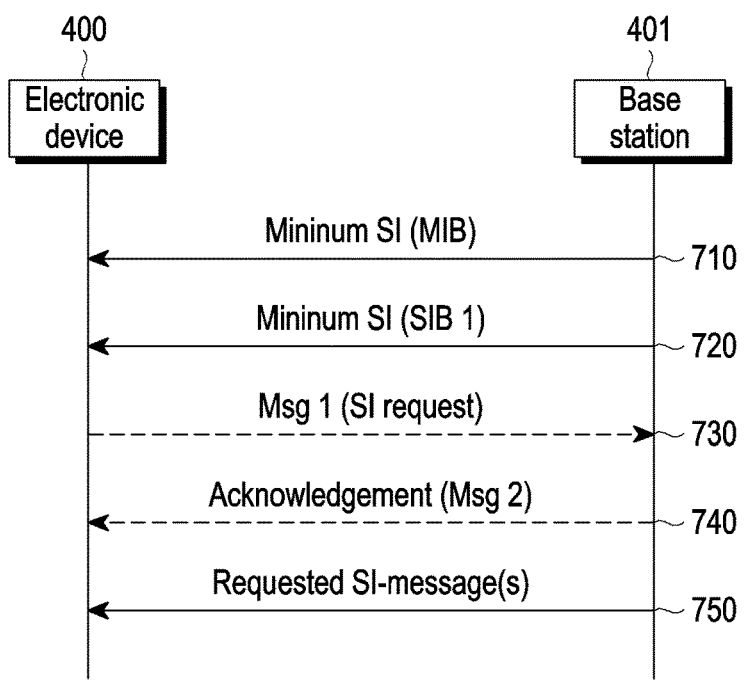
FIG. 7 illustrates a signal flowchart illustrating a method of receiving system information from a base station in an electronic device according to an embodiment of the disclosure.
Figure 8:
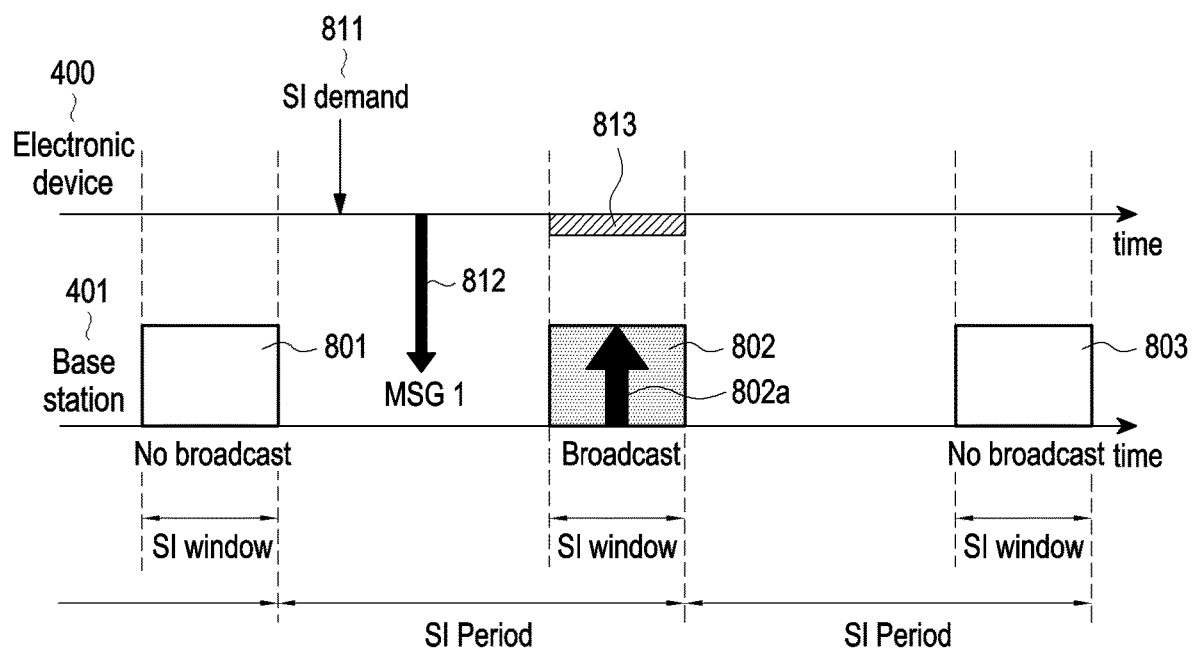
FIG. 8 is a diagram illustrating timing at which a base station transmits system information according to an embodiment of the disclosure.

FIG. 7 illustrates a signal flowchart illustrating a method of receiving system information from a base station in an electronic device according to an embodiment of the disclosure, and FIG. 8 is a diagram illustrating timing at which a base station transmits system information according to an embodiment of the disclosure.

Referring to FIGS. 7 and 8, the electronic device 400 (user equipment (UE)) (e.g., electronic device 101 of FIG. 1) may receive and decode the MIB from the base station 401 (e.g., gNB) in operation 710. The electronic device 400 may receive and decode SIB1 in operation 720 with reference to information included in the received MIB. When it is confirmed that there is an SIB that is not periodically broadcast with reference to the information included in the received SIB1, and it is confirmed that there is an RA resource corresponding to the SI, the electronic device 400 may transmit the SI request to the base station 401 by transmitting message 1 (Msg1) among the messages included in the random access procedure in operation 730.

According to various embodiments, referring to FIG. 8, the SIB configured not to be broadcast by the base station 401 may not be repeatedly broadcast every SI period. For example, the base station 401 may not transmit SI or SIB within the period of the first SI window 801 in the first SI period, and may not transmit SI or SIB within the period of the third SI window 803 in the third SI period. According to various embodiments, after decoding SIB1, if the electronic device 400 determines at least one SIB configured to not be broadcast, the electronic device 400 may identify the RA resource corresponding to the corresponding SIB or SI by using the information included in Table 4 above. The electronic device may transmit a random access preamble that is message 1 (Msg1) to the base station 401 in a time interval set based on the identified RA resource. Upon receiving the random access preamble, the base station 401 may determine that the SI request is being transmitted by identifying a time interval corresponding to the random access preamble. In response to the reception of the random access preamble, the base station 401 may transmit the RAR to the electronic device 400 as message 2 (Msg2) in operation 740 and transmit the corresponding SI message to the electronic device 400 according to the transmitted SI request in operation 750.

For example, referring to FIG. 8, the electronic device may identify at least one SIB configured to not be broadcast through SIB1 and determine that a demand 811 for a corresponding SI is generated from at least one processor (e.g., processor 120, first communication processor 212, second communication processor 214, and unified communication processor 260) in the electronic device 400. According to various embodiments, the electronic device 400 may store the initially received SIB1 message, and then determine that the SI demand has occurred when the SI configuration information is changed. According to various embodiments, the electronic device 400 may determine that the SI demand has occurred when it is confirmed that the version of the at least one currently stored SIB is invalid. According to the SI demand 811, the electronic device 400 may identify the random access occasion configured for the SI with reference to SIB1 as described above. The electronic device 400 may transmit the message 1 (Msg1) 812 included in the random access procedure to the base station 401 in a time interval corresponding to the identified random access occasion. The base station 401 receiving the message 1 812 may determine that the transmission of the message 1 812 is a request for a specific SI or SIB, and may transmit the corresponding SI or SIB 802a to the electronic device 400 in the configured SI window 802. According to various embodiments, the corresponding SI or SIB 802a transmitted in the configured SI window 802 may be an SI or SIB requested from another electronic device located in the same cell as the electronic device 400.

The electronic device 400 that has transmitted the SI request through the message 1 812 may receive the message 2 from the base station 401, and may monitor 813 the corresponding SI or the corresponding SIB 802a transmitted through the SI window 802 within the corresponding SI period or the first arriving SI window 802. As a result of the monitoring, if the corresponding SIB 802a is not decoded (e.g., when decoding of the corresponding SIB fails), the SI window 803 within the next SI period may be monitored. When another electronic device in the cell transmits an SI request for the SI window 803 within the next SI period, the electronic device 400 may receive the corresponding SI or SIB by monitoring the SI window 803 within the next SI period.

Figure 9:
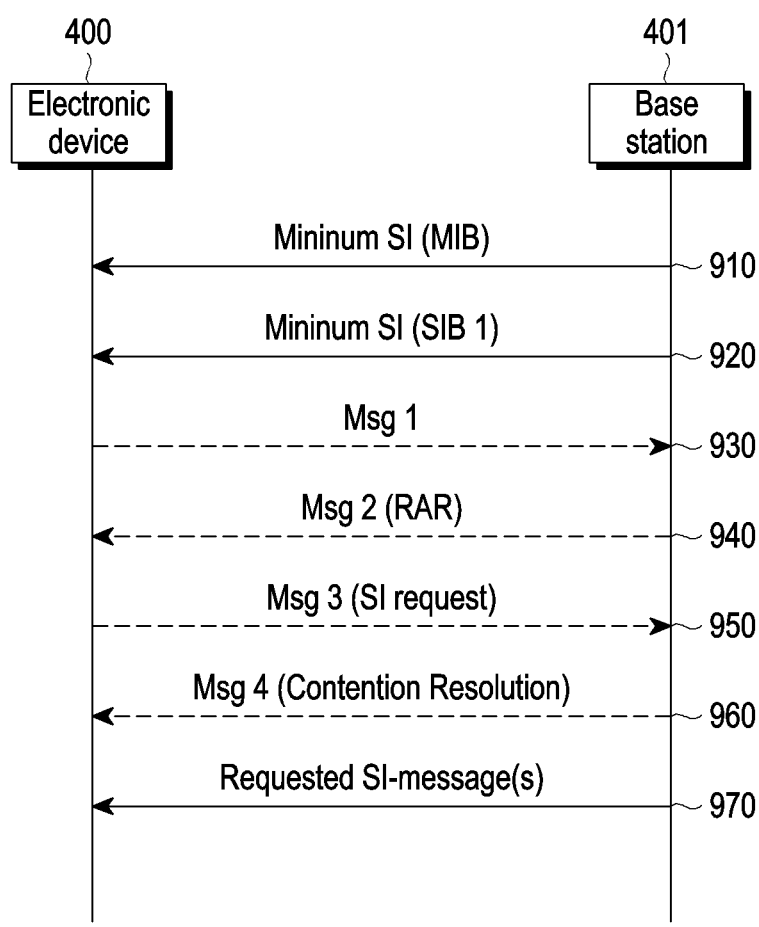
FIG. 9 illustrates a signal flowchart illustrating a method of receiving system information from a base station in an electronic device according to an embodiment of the disclosure.
Figure 10:
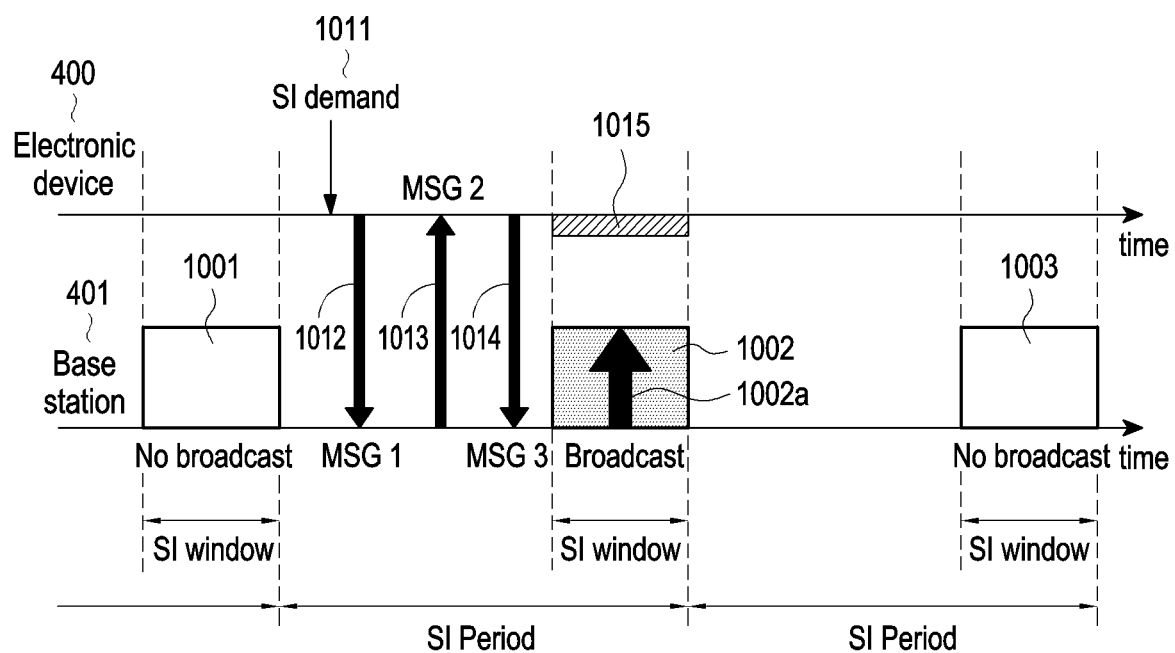
FIG. 10 is a diagram illustrating timing at which a base station transmits system information according to an embodiment of the disclosure.

FIG. 9 illustrates a signal flowchart illustrating a method of receiving system information from a base station in an electronic device according to an embodiment of the disclosure, and FIG. 10 is a diagram illustrating timing at which a base station transmits system information according to an embodiment of the disclosure.

Referring to FIGS. 9 and 10, the electronic device 400 (user equipment (UE)) (e.g., electronic device 101 of FIG. 1) may receive and decode the MIB from the base station 401 (e.g., gNB) in operation 910. The electronic device 400 may receive and decode SIB1 in operation 920 with reference to information included in the received MIB. When it is confirmed that there is an SIB that is not periodically broadcast with reference to the information included in the received SIB1, and it is confirmed that an RA resource corresponding to the SI does not exist, the electronic device 400 may transmit message 1 (Msg1) among messages included in the random access procedure in operation 930. In operation 940, the base station 401 may transmit message 2 (Msg2) as an RAR to the electronic device 400 in response to the reception of the message 1. According to various embodiments, the electronic device 400 may transmit an SI request to the base station 401 through message 3 (Msg3) in operation 950. For example, the electronic device 400 may transmit the SI request message to the base station 401 in operation 950 using the UL-SCH resource allocated by the RAR from the base station 401 in operation 940. The base station 401 may transmit the message 4 (Msg4) to the electronic device in response to the reception of the message 3 in operation 960. The base station 401 may confirm the SI request transmitted through the message 3 and transmit the corresponding SI message to the electronic device 400 according to the transmitted SI request in operation 970.

According to various embodiments, when the electronic device 400 and the base station 401 transmit and receive messages based on the random access procedure of the step 2 (2-step), the electronic device 400 may transmit a "message A preamble" instead of message 1 and transmit a "message A payload" corresponding to message 3 through a physical uplink shared channel (PUSCH) before receiving message 2. According to various embodiments, the electronic device 400 may transmit an SI request through the message A payload. The base station 401 may determine the SI request by decoding the message A payload transmitted from the electronic device 400. The base station 401 may transmit a corresponding SI or SIB within a configured SI window in response to the SI request.

According to various embodiments, referring to FIG. 10, the SIB configured not to be broadcast by the base station 401 may not be repeatedly broadcast every SI period. For example, the base station 401 may not transmit SI or SIB within the period of the first SI window 1001 in the first SI period, and may not transmit SI or SIB within the third SI window 1003 period in the third SI period. According to various embodiments, after decoding SIB1, if the electronic device 400 determines at least one SIB configured to not be broadcast, the electronic device 400 may identify whether an RA resource for the corresponding SIB exists in SIB1. As a result of the identification, if the RA resource does not exist, the electronic device may transmit an SI request using message 3.

For example, referring to FIG. 10, the electronic device may identify at least one SIB configured to not be broadcast through SIB1 and determine that a demand 1011 for a corresponding SI is generated from at least one processor (e.g., processor 120, first communication processor 212, second communication processor 214, and unified communication processor 260) in the electronic device 400. According to various embodiments, the electronic device 400 may store the initially received SIB1 message, and then determine that the SI request has occurred when the SI configuration information is changed. According to various embodiments, the electronic device 400 may determine that the request for the SI has occurred when it is confirmed that the version of the at least one currently stored SIB is invalid. In response to the SI demand 1011, the electronic device 400 may transmit message 1 1012 to the base station 401 and receive message 2 1013 from the base station 401 as described above. The electronic device 400 may transmit the message 3 1014 through the UL-SCH allocated to the electronic device 400 through the message 2 1013. For example, the electronic device 400 may transmit an SI request message to the base station through the allocated UL-SCH. The SI request message may be included in an RRC system information request message (RRCSsystemInfoRequest). The base station 401 receiving the message 3 1014 may identify the SI request message of the message 3 1014 and transmit the corresponding SI or SIB 1002a to the electronic device 400 in the configured SI window 1002. According to various embodiments, the corresponding SI or SIB 1002a transmitted in the configured SI window 1002 may be an SI or SIB requested from another electronic device located in the same cell as the electronic device 400.

The electronic device 400 that has transmitted the SI request through the message 3 1014 may receive message 4 from the base station 401 and monitor 1015 the corresponding SI or the corresponding SIB 1002a transmitted through the SI window 1002 within the corresponding SI period or the first arriving SI window 1002. As a result of the monitoring, when the corresponding SIB 1002a is not decoded (e.g., the decoding of the corresponding SIB fails), the SI window 1003 within the next SI period may be monitored. When another electronic device in the cell transmits an SI request for the SI window 1003 within the next SI period, the electronic device 400 may receive the corresponding SI or SIB by monitoring the SI window 1003 within the next SI period.

Hereinafter, methods for the electronic device 101 to receive system information after handover according to various embodiments will be described with reference to FIGS. 11 to 13, 14A, 14B, and 15 to 17.

Figure 11:
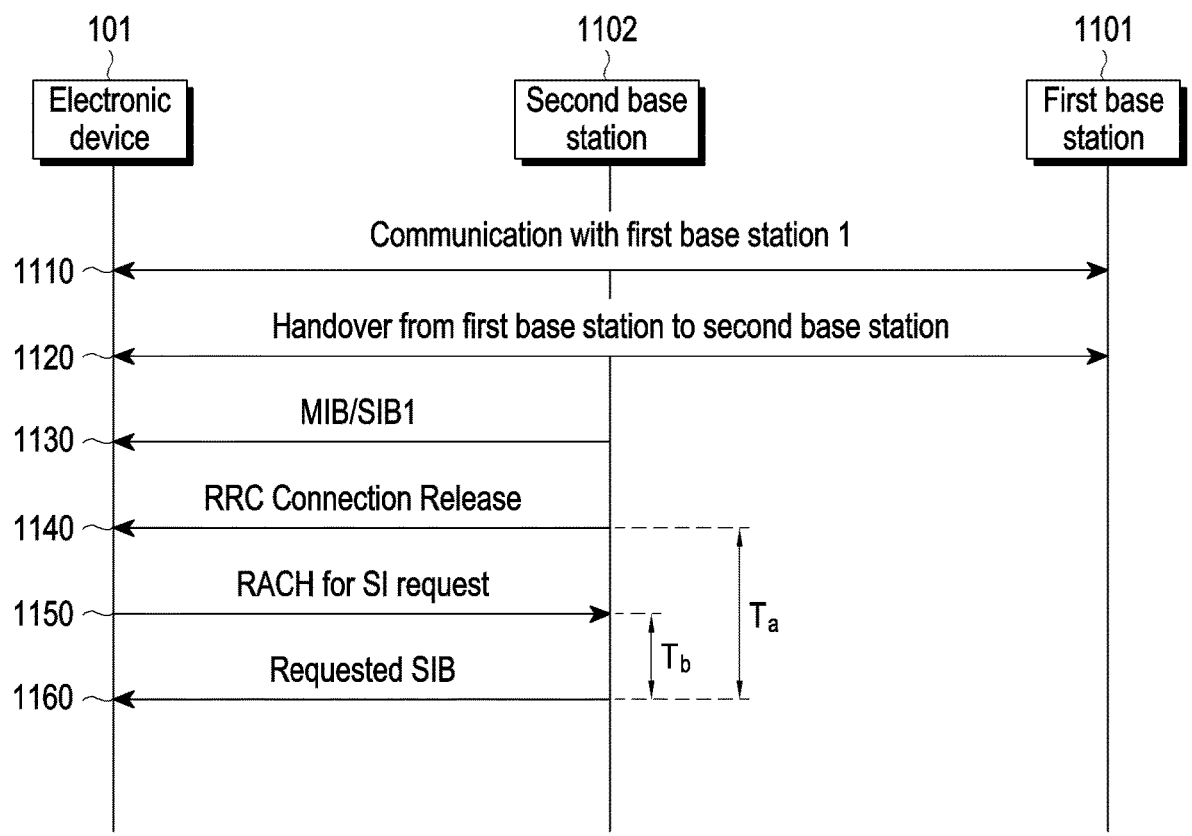
FIG. 11 illustrates a flowchart illustrating a method of receiving system information in an electronic device according to an embodiment of the disclosure.

FIG. 11 illustrates a flowchart illustrating a method of receiving system information in an electronic device according to an embodiment of the disclosure.

Referring to FIG. 11, the electronic device 101 may communicate with the first base station 1101 in operation 1110. The electronic device 101 may transmit and receive data to and from the first base station 1101 in a radio resource control (RRC) connection state. According to various embodiments, the electronic device 101 may perform handover from the first base station 1101 to the second base station 1102 in operation 1120. According to various embodiments, in the embodiments described below, the first base station 1101 and the second base station 1102 may be base stations of the same RAT or base stations of different RATs. For example, the first base station 1101 may be a 5G base station, and the second base station 1102 may be a 5G base station. As another example, the first base station 1101 may be an LTE base station, and the second base station 1102 may be a 5G base station. The handover may be performed at the request of the electronic device 101 or at the request of the first base station 1101, and various embodiments described below are not limited to a specific handover method. For example, the first base station 1101 may transmit a handover command message instructing the electronic device 101 to handover to the second base station 1102 to the electronic device 101, and the electronic device 101 may transmit a handover complete message to the first base station 1101 or the second base station 1102 after performing handover from the first base station 1101 to the second base station 1102 while maintaining the RRC connection.

According to various embodiments, the electronic device 101 may receive system information (e.g., MIB or SIB1) from the second base station 1102 newly accessed by handover in operation 1130. According to various embodiments, when there is no data transmission/reception between the electronic device 101 and the second base station 1102 for a predetermined time, the RRC connection state may be switched to the RRC idle state. For example, the electronic device 101 may perform an RRC connection release operation as a preset data inactivity timer expires. According to another embodiment, the electronic device 101 may switch from the RRC connected state to the RRC idle state upon receiving the RRC connection release message from the second base station 1102 in operation 1140.

According to various embodiments, the state in which the electronic device 101 is RRC connected to the base station may be referred to as an RRC connected state, but various embodiments are not limited thereto. According to various embodiments, the base station may transmit data inactivity timer information to the electronic device 101. For example, the data inactivity timer information may correspond to "dataInactivityTimer" disclosed in 3GPP standard document TS 38.321 5.19 or TS 38.331 5.3.8.5, but is not limited thereto.

According to various embodiments, the electronic device 101 (e.g., the RRC layer of the electronic device 101) may control the data inactivity operation by setting or driving a data inactivity timer based on a set value corresponding to the data inactivity timer information received from the second base station 1102. According to various embodiments, when a medium access control (MAC) entity receives or transmits a MAC service data unit (SDU) (e.g., medium access control (MAC) data for at least one logical channel of a dedicated traffic channel (DTCH), a dedicated control channel (DCCH), and a common control channel (CCCH)), the electronic device 101 may determine that transmission or reception data with the second base station 1102 exists. When there is data transmitted or received with the second base station 1102, the electronic device 101 may control to reset or restart the data inactivity timer being driven. According to various embodiments, when there is no transmission or reception data with the second base station 1102 for a set time corresponding to the data inactivity timer information, the electronic device 101 may determine that the data inactivity timer has expired, and may perform at least one operation configured for RRC connection release. For example, the electronic device 101 may perform RRC connection release by performing at least one operation disclosed in 3GPP standard document TS 38.331 5.3.11. As the RRC connection release is performed, the electronic device 101 may be switched from the RRC connected state to the RRC idle state.

According to various embodiments, the electronic device 101 may receive system information (e.g., SIB2, SIB3, SIB4, or SIB5) necessary for performing a cell reselection procedure to another base station in the RRC idle state from the second base station 1102. According to various embodiments, by identifying the SIB1, the electronic device 101 may identify that at least one SIB among the system information required to perform the cell reselection procedure is the system information received by the request. For example, as described above in Table 2, when the broadcast status information (si-BroadcastStatus) of a specific SIB in the system information (SI) scheduling information (si-SchedulingInfo) in SIB1 is configured to "broadcasting", the corresponding SIB may be broadcast, and when "not Broadcasting" is configured, the corresponding SIB may be provided by the electronic device requesting the corresponding SIB through an on-demand method. For example, in Table 2, it may be confirmed that SIB2 is configured as a broadcast SIB, and it may be confirmed that SIB3 is configured as a non-broadcast SIB (e.g., SIB provided by on-demand method). According to various embodiments, according to Table 2, the SI period (si-Periodicity) of SIB2 may be set to 320 ms, and the SI period of SIB3 may be set to 640 ms.

According to various embodiments, the electronic device 101, in operation 1150, may transmit the request for the SIB (e.g., SI request) provided by the on-demand method to the second base station 1102 through the RACH as described above with reference to FIG. 7 or FIG. 9. The second base station 1102 may receive the request for the SIB of the electronic device 101 and transmit the requested SIB in operation 1160.

Referring to FIG. 11, after the RRC connection release in operation 1140, a reception delay of the SIB may occur until the electronic device 101 receives the requested SIB in operation 1160. After releasing the RRC connection in operation 1140, the electronic device 101 may increase current consumption by requesting and receiving the SIB according to operations 1150 and 1160 in the RRC idle state.

In various embodiments to be described below, after the electronic device 101 is handed over and before the RRC connection with the base station is released, a system information request is transmitted, thereby preventing SIB reception delay and reducing unnecessary current consumption.

Figure 12:
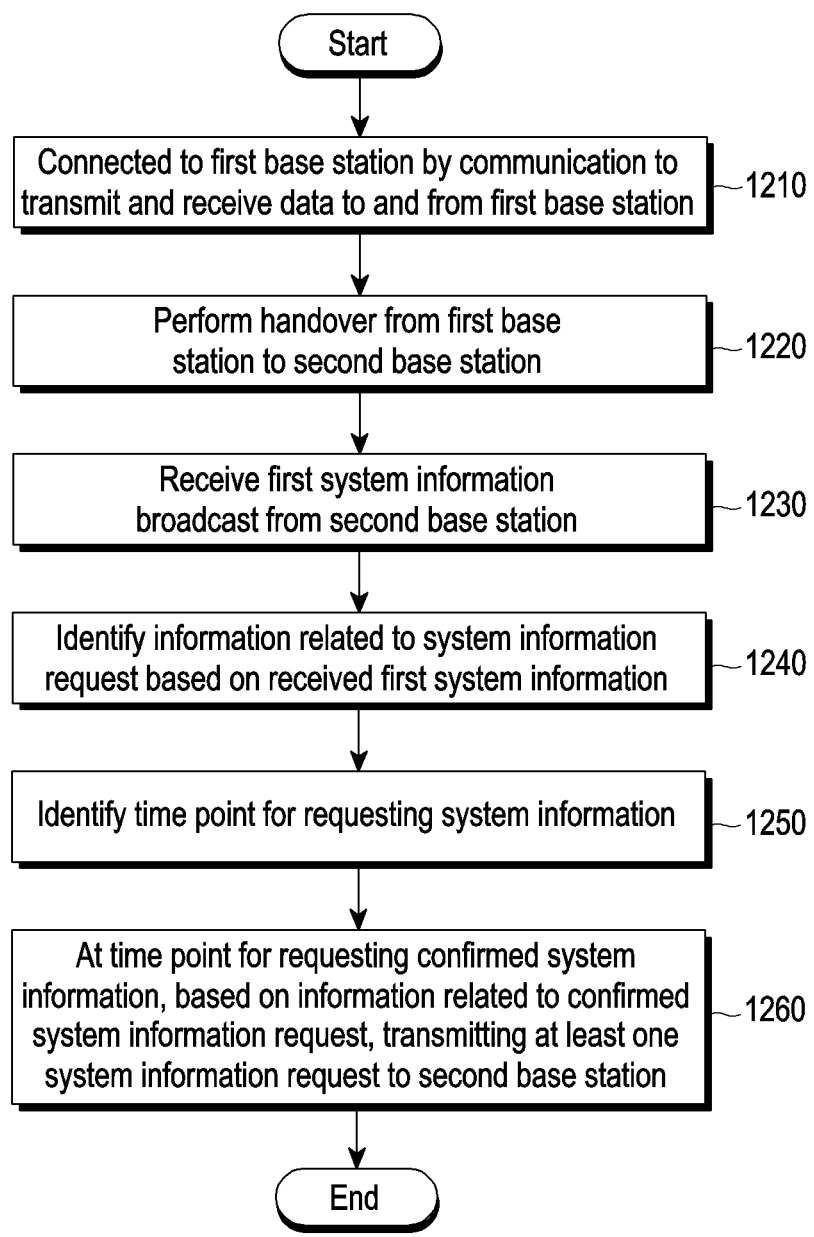
FIG. 12 illustrates a flowchart illustrating a method of operating an electronic device according to an embodiment of the disclosure.

FIG. 12 illustrates a flowchart illustrating a method of operating an electronic device according to an embodiment of the disclosure.

Referring to FIG. 12, according to various embodiments, the electronic device (e.g., the electronic device 101 of FIG. 1) (e.g., the wireless communication module 192, the first communication processor 212, the second communication processor 214, and the unified communication processor 260) may be connected to a first base station by communication in operation 1210 to transmit and receive data to and from the first base station. The electronic device 101 may transmit and receive data to and from the first base station 1101 in a radio resource control (RRC) connection state.

According to various embodiments, the electronic device 101 may perform handover from the first base station 1101 to the second base station 1102 in operation 1220. The handover may be performed at the request of the electronic device 101 or at the request of the first base station 1101, and various embodiments described below are not limited to a specific handover method. For example, the first base station 1101 may transmit a handover command message instructing the electronic device 101 to handover to the second base station 1102 to the electronic device 101, and the electronic device 101 may transmit a handover complete message to the first base station 1101 or the second base station 1102 after performing handover from the first base station 1101 to the second base station 1102 while maintaining the RRC connection.

According to various embodiments, the electronic device 101 may receive system information (e.g., MIB or SIB1) from the second base station 1102 newly accessed by handover in operation 1230. The system information received by the electronic device 101 from the second base station 1102 may include first system information (e.g., SIB1).

According to various embodiments, in operation 1240, the electronic device 101 may identify information related to a system information request based on the received first system information. For example, by identifying the SIB1, the electronic device 101 may identify that at least one SIB among the system information required to perform the cell reselection procedure is the system information received by the request. For example, as described above in Table 2, when the broadcast status information (si-BroadcastStatus) of a specific SIB in the system information (SI) scheduling information (si-SchedulingInfo) in SIB1 is configured to "broadcasting", the corresponding SIB may be broadcast, and when "not Broadcasting" is configured, the corresponding SIB may be provided by the electronic device requesting the corresponding SIB through an on-demand method.

According to various embodiments, the electronic device 101 may identify a time point for requesting system information received by the on-demand method in operation 1250. The time point for requesting the system information may be set to be performed in the RRC connection state before the electronic device 101 switches to the RRC idle state according to the RRC connection release. According to various embodiments, the electronic device 101 may release the RRC connection when the data inactivity timer (DataInactivityTimer) expires. Based on the data inactivity timer, the electronic device 101 may control to transmit a system information request (e.g., "SI request") before the data inactivity timer expires. For example, the electronic device 101 may set a time point for requesting system information based on the data inactivity timer.

According to various embodiments, the electronic device 101 may set a time point for requesting the system information based on at least one of the data inactivity timer, an SI period (e.g., si-Periodicity), and the strength of a received signal. For example, the electronic device 101 may set a time point for requesting system information by Equation 1 below.

$$\text{siRequestTimer}=\text{dataInactivityTimer}-(\text{si-Periodicity}\times \alpha+100\text{ ms})\qquad \text{Equation 1}$$

Referring to Equation 1, a timer setting value (siRequestTimer) for requesting system information may be set based on a difference from a data inactivity timer setting value (dataInactivityTimer) to a sum of a multiple of an SI period (si-Periodicity) and a constant value (e.g., 100 ms). For example, the electronic device 101 may request system information before the data inactivity timer expires according to Equation 1 above. In Equation 1, a may be set differently depending on the strength (or electric field state) of the received signal. For example, when the intensity of the received signal (e.g., reference signal received power (RSRP)) of the electronic device 101 is greater than or equal to a set threshold (e.g., −100 dBm), a may be set to 1, and when the intensity of the received signal is less than the set threshold, a may be set to 2. By differently setting a according to the strength of the received signal (e.g., by setting a to a relatively large value in a weak electric field), the electronic device 101 may increase the probability of successful reception of system information. For example, in a weak electric field, the electronic device 101 may set the timer setting value (siRequestTimer) for requesting system information to be small by setting a to be relatively large. Accordingly, by requesting system information at a relatively early time in a weak electric field, the electronic device 101 may increase the available reception time of the system information before the electronic device 101 is converted to the RRC idle state, thereby increasing the reception probability of the system information. According to various embodiments, when there are a plurality of SIBs to be received, the SI period in Equation 1 may be set to the largest value among SI periods set for each of the plurality of SIBs.

According to various embodiments, at a time point for requesting the confirmed system information in operation 1260, the electronic device 101 may transmit at least one system information request to the second base station based on the information related to the system information request confirmed through the SIB1.

For example, assuming the data inactivity timer set value received by the electronic device 101 from the base station is 10s, the SI periods of SIB2, SIB3, and SIB4 are all 640 ms, the SI period of SIB5 is 1280 ms, and the measured RSRP is −90 dBm, the siRequestTimer may be calculated as 8620 ms (10000 ms−(1280 ms×1+100 ms)) according to Equation 1. When the electronic device 101 performs a handover and the data inactivity period lasts for 8620 ms, the electronic device 101 may transmit a request for system information to a base station (e.g., the second base station). For example, the electronic device 101 may transmit the request for the SIB (e.g., SI request) provided by the on-demand method to the base station (the second base station) through the RACH as described above with reference to FIG. 7 or FIG. 9. The base station may receive the request for the SIB of the electronic device 101 and transmit the requested SIB.

According to various embodiments, after transmitting the request for system information, the electronic device 101 may receive the requested system information for a period of 1380 ms, excluding the time (e.g., 100 ms) required for the RACH procedure, until the data inactivity timer expires and the RRC connection is released. When the electronic device 101 receives the system information and the data inactivity timer expires, the electronic device 101 may release the RRC connection.

Figure 13:
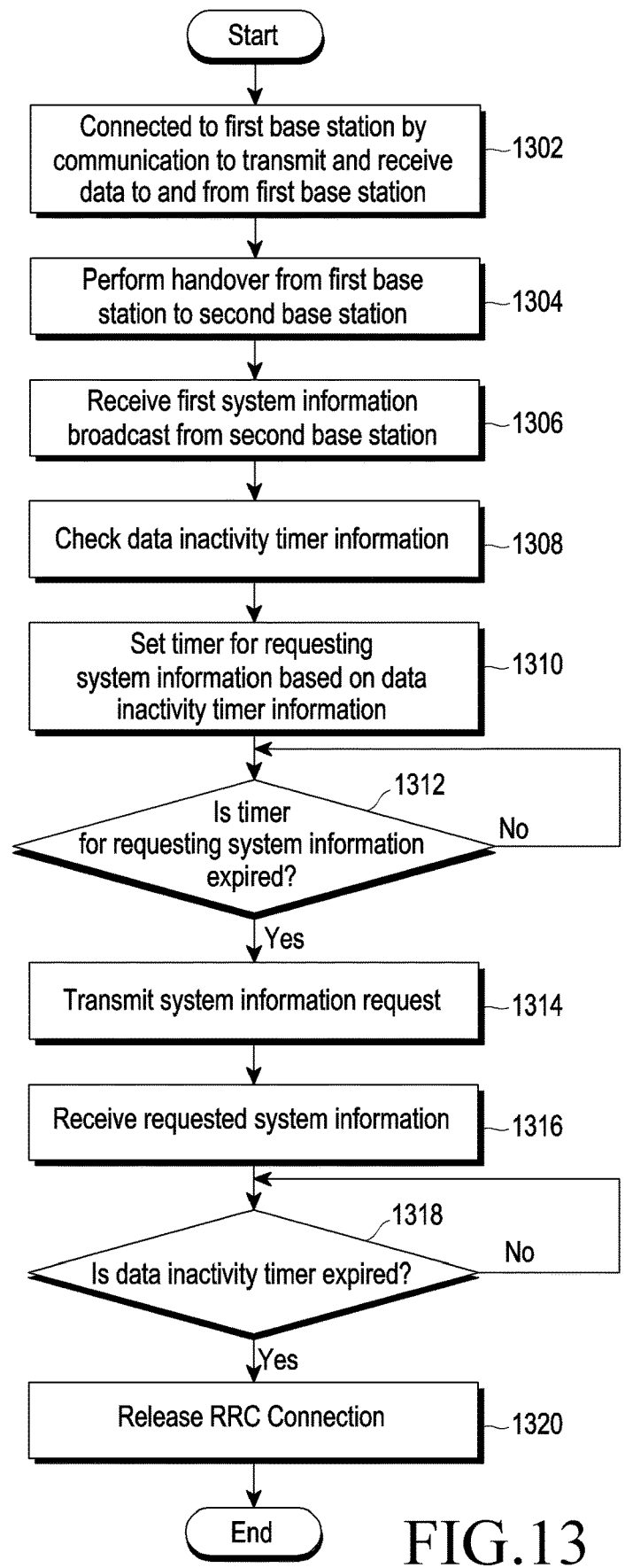
FIG. 13 illustrates a flowchart illustrating a method of operating an electronic device according to an embodiment of the disclosure.

FIG. 13 illustrates a flowchart illustrating a method of operating an electronic device according to an embodiment of the disclosure.

Referring to FIG. 13, according to various embodiments, the electronic device (e.g., the electronic device 101 of FIG. 1) (e.g., the wireless communication module 192, the first communication processor 212, the second communication processor 214, and the unified communication processor 260) may be connected to a first base station by communication in operation 1302 to transmit and receive data to and from the first base station. The electronic device 101 may transmit and receive data to and from the first base station 1101 in a radio resource control (RRC) connection state.

According to various embodiments, the electronic device 101 may perform handover from the first base station 1101 to the second base station 1102 in operation 1304. The handover may be performed at the request of the electronic device 101 or at the request of the first base station 1101, and various embodiments described below are not limited to a specific handover method. For example, the first base station 1101 may transmit a handover command message instructing the electronic device 101 to handover to the second base station 1102 to the electronic device 101, and the electronic device 101 may transmit a handover complete message to the first base station 1101 or the second base station 1102 after performing handover from the first base station 1101 to the second base station 1102 while maintaining the RRC connection.

According to various embodiments, the electronic device 101 may receive system information (e.g., MIB or SIB1) from the second base station 1102 newly accessed by handover in operation 1306. The system information received by the electronic device 101 from the second base station 1102 may include first system information (e.g., SIB1).

According to various embodiments, the electronic device 101 may identify data inactivity timer information in operation 1308. According to various embodiments, the data inactivity timer information may be received from the second base station 1102 as described above or may be directly configured by the electronic device 101.

According to various embodiments, in operation 1310, the electronic device 101 may set a timer for requesting system information based on the data inactivity timer information. For example, the electronic device 101 may set a timer for requesting system information based on the data inactivity timer information, the SI period, and the strength of the received signal according to Equation 1 described above.

According to various embodiments, in operation 1312, when the timer for requesting system information has not expired (operation 1312—NO), the electronic device 101 may continue to operate the timer for requesting system information. According to various embodiments, the timer for requesting the system information may operate when there is no transmission/reception data between the electronic device 101 and the second base station 1102.

According to various embodiments, in operation 1312, when the timer for requesting system information expires (operation 1312—Yes) (e.g., when the data inactive state is maintained until the timer for requesting system information expires), the electronic device 101 may confirm information related to the system information request based on the first system information, and transmit the system information request in operation 1314. For example, by identifying the SIB1, the electronic device 101 may confirm that at least one SIB among the system information required to perform the cell reselection procedure is the system information received by the request. For example, as described above in Table 2, when the broadcast status information (si-BroadcastStatus) of a specific SIB in the system information (SI) scheduling information (si-SchedulingInfo) in SIB1 is configured to "broadcasting", the corresponding SIB may be broadcast, and when "not Broadcasting" is configured, the corresponding SIB may be provided by the electronic device requesting the corresponding SIB through an on-demand method.

According to various embodiments, when the timer for the system information request expires in operation 1314, the electronic device 101 may transmit at least one system information request to the second base station based on the information related to the system information request confirmed through the SIB1.

According to various embodiments, the electronic device 101 may receive the requested system information in operation 1316. For example, after transmitting the system information request in operation 1314, the electronic device 101 may receive the requested system information until the data inactivity timer expires and the RRC connection is released.

According to various embodiments, the electronic device 101 may identify whether the data inactivity timer has expired in operation 1318. As a result of the identification, when the data inactivity timer has not expired (operation 1318—NO), the data inactivity timer may continue to operate. According to various embodiments, the data inactivity timer may operate when a state in which there is no transmission/reception data between the electronic device 101 and the second base station 1102 is maintained.

According to various embodiments, when the data inactivity timer expires (operation 1318—Yes) (e.g., when the data inactivity state remains until the data inactivity timer expires) in operation 1318, the electronic device 101 may release the RRC connection in operation 1320. For example, the electronic device 101 may perform RRC connection release by performing at least one operation disclosed in 3GPP standard document TS 38.331 5.3.11. As the RRC connection release is performed, the electronic device 101 may be switched from the RRC connected state to the RRC idle state.

Figure 14A:
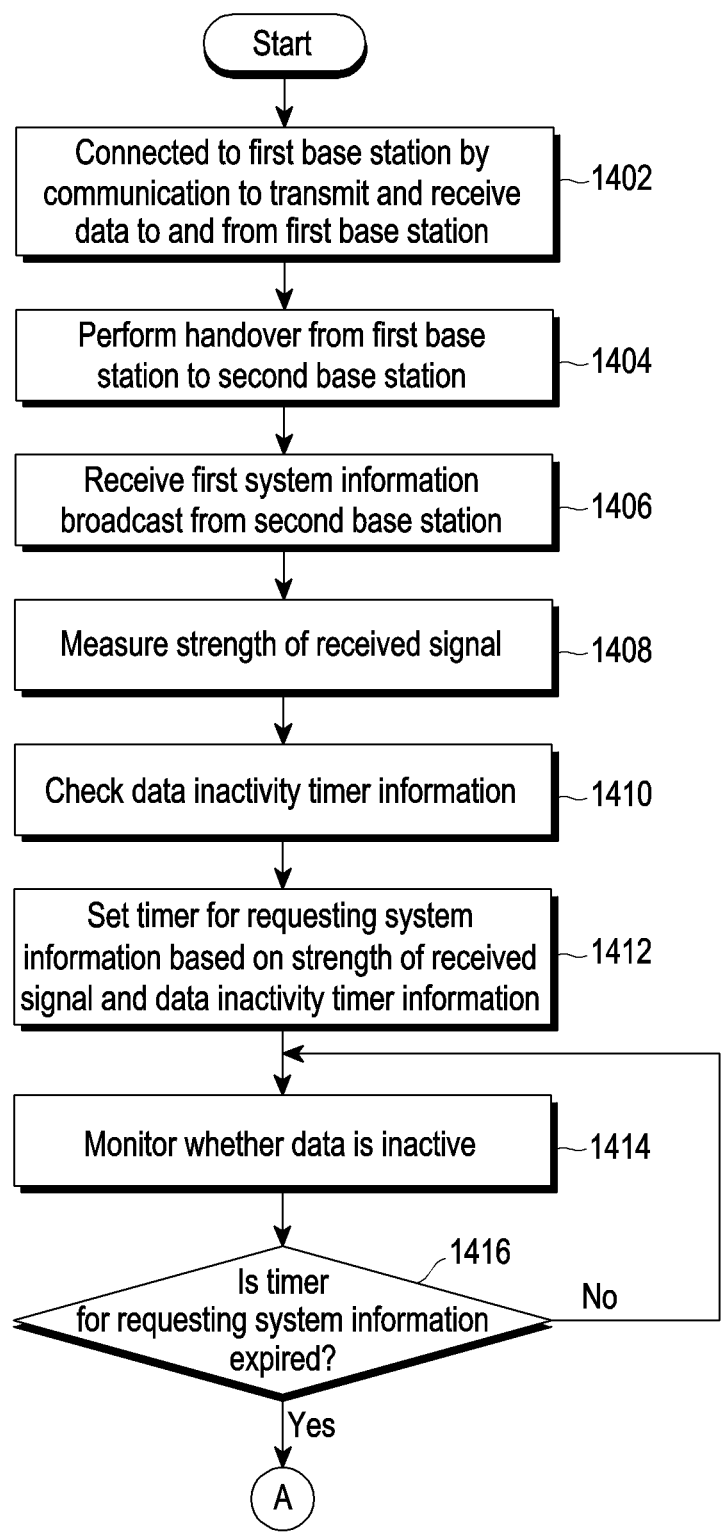
FIGS. 14A and 14B illustrate flowcharts for illustrating a method of operating an electronic device according to various embodiments of the disclosure.
Figure 14B:
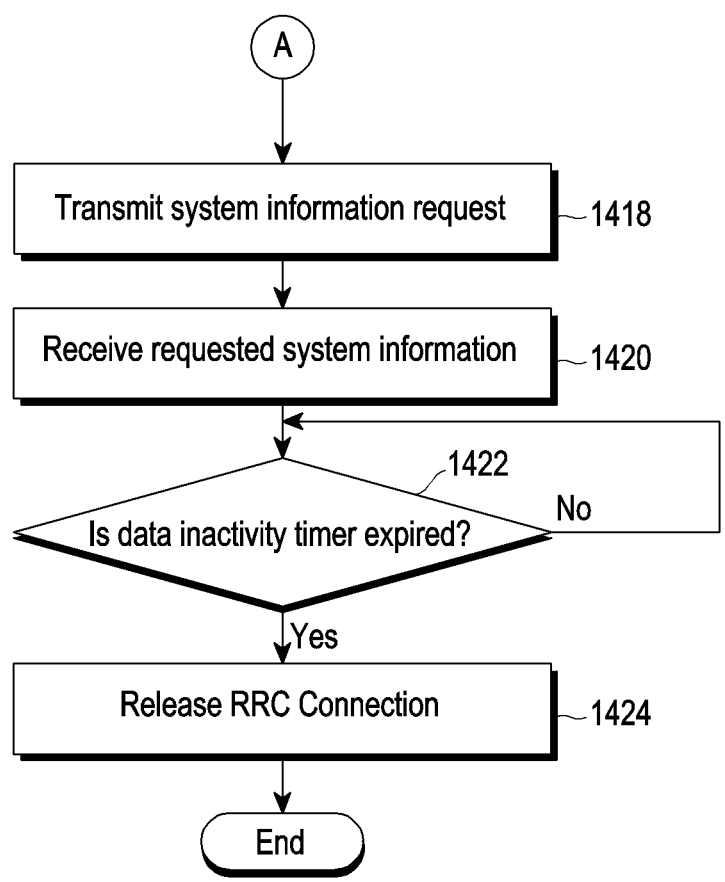

FIGS. 14A and 14B illustrate flowcharts for illustrating a method of operating an electronic device according to various embodiments of the disclosure.

Referring to FIGS. 14A and 14B, according to various embodiments, the electronic device (e.g., the electronic device 101 of FIG. 1) (e.g., the wireless communication module 192, the first communication processor 212, the second communication processor 214, and the unified communication processor 260) may be connected to a first base station by communication in operation 1402 to transmit and receive data to and from the first base station. The electronic device 101 may transmit and receive data to and from the first base station 1101 in a radio resource control (RRC) connection state.

According to various embodiments, the electronic device 101 may perform handover from the first base station 1101 to the second base station 1102 in operation 1404. The handover may be performed at the request of the electronic device 101 or at the request of the first base station 1101, and various embodiments described below are not limited to a specific handover method. For example, the first base station 1101 may transmit a handover command message instructing the electronic device 101 to handover to the second base station 1102 to the electronic device 101, and the electronic device 101 may transmit a handover complete message to the first base station 1101 or the second base station 1102 after performing handover from the first base station 1101 to the second base station 1102 while maintaining the RRC connection.

According to various embodiments, the electronic device 101 may receive system information (e.g., MIB or SIB1) from the second base station 1102 newly accessed by handover in operation 1406. The system information received by the electronic device 101 from the second base station 1102 may include first system information (e.g., SIB1).

According to various embodiments, the electronic device 101 may measure the strength of the received signal in operation 1408. For example, the strength of the received signal may include reference signal received power (RSRP).

According to various embodiments, the electronic device 101 may identify data inactivity timer information in operation 1410. According to various embodiments, the data inactivity timer information may be received from the second base station 1102 as described above or may be directly configured by the electronic device 101.

According to various embodiments, in operation 1412, the electronic device 101 may set a timer for requesting system information based on the strength of the received signal and the data inactivity timer information. For example, the electronic device 101 may set a timer for requesting system information based on the data inactivity timer information, the SI period, and the strength of the received signal according to Equation 1 described above.

According to various embodiments, the electronic device 101 may monitor whether data is inactive in operation 1414. According to various embodiments, when a medium access control (MAC) entity receives or transmits a MAC service data unit (SDU) (e.g., medium access control (MAC) data for at least one logical channel of a dedicated traffic channel (DTCH), a dedicated control channel (DCCH), and a common control channel (CCCH)), the electronic device 101 may determine that transmission or reception data with the second base station 1102 exists. When there is data transmitted or received with the second base station 1102, the electronic device 101 may control to reset or restart the data inactivity timer being driven. According to various embodiments, when there is no transmission or reception data with the second base station 1102 during a set value time corresponding to the data inactivity timer information, the electronic device 101 may determine that the data inactivity timer has expired, and may perform at least one operation configured for RRC connection release. For example, the electronic device 101 may perform RRC connection release by performing at least one operation disclosed in 3GPP standard document TS 38.331 5.3.11. As the RRC connection release is performed, the electronic device 101 may be switched from the RRC connected state to the RRC idle state.

According to various embodiments, in operation 1416, when the timer for requesting system information expires before the data inactivity timer expires (operation 1416—Yes) (e.g., when the data inactive state is maintained until the timer for requesting system information expires), the electronic device 101 may confirm the information related to the system information request based on the first system information, and transmit the system information request in operation 1418. For example, by identifying the SIB1, the electronic device 101 may confirm that at least one SIB among the system information required to perform the cell reselection procedure is the system information received by the request. For example, as described above in Table 2, when the broadcast status information (si-BroadcastStatus) of a specific SIB in the system information (SI) scheduling information (si-SchedulingInfo) in SIB1 is configured to "broadcasting", the corresponding SIB may be broadcast, and when "not Broadcasting" is configured, the corresponding SIB may be provided by the electronic device requesting the corresponding SIB through an on-demand method.

According to various embodiments, when the timer for the system information request expires, in operation 1418, the electronic device 101 may transmit at least one system information request to the second base station based on the information related to the system information request confirmed through the SIB1.

According to various embodiments, the electronic device 101 may receive the requested system information in operation 1420. For example, after transmitting the system information request, in operation 1420, the electronic device 101 may receive the requested system information until the data inactivity timer expires and the RRC connection is released.

According to various embodiments, the electronic device 101 may identify whether the data inactivity timer has expired in operation 1422. As a result of the identification, when the data inactivity timer has not expired (operation 1422—NO), the data inactivity timer may continue to operate. According to various embodiments, the data inactivity timer may operate when a state in which there is no transmission/reception data between the electronic device 101 and the second base station 1102 is maintained.

According to various embodiments, when the data inactivity timer expires (operation 1422—Yes) (e.g., when the data inactivity state remains until the data inactivity timer expires) in operation 1422, the electronic device 101 may release the RRC connection in operation 1424. For example, the electronic device 101 may perform RRC connection release by performing at least one operation disclosed in 3GPP standard document TS 38.331 5.3.11. As the RRC connection release is performed, the electronic device 101 may be switched from the RRC connected state to the RRC idle state.

Figure 15:
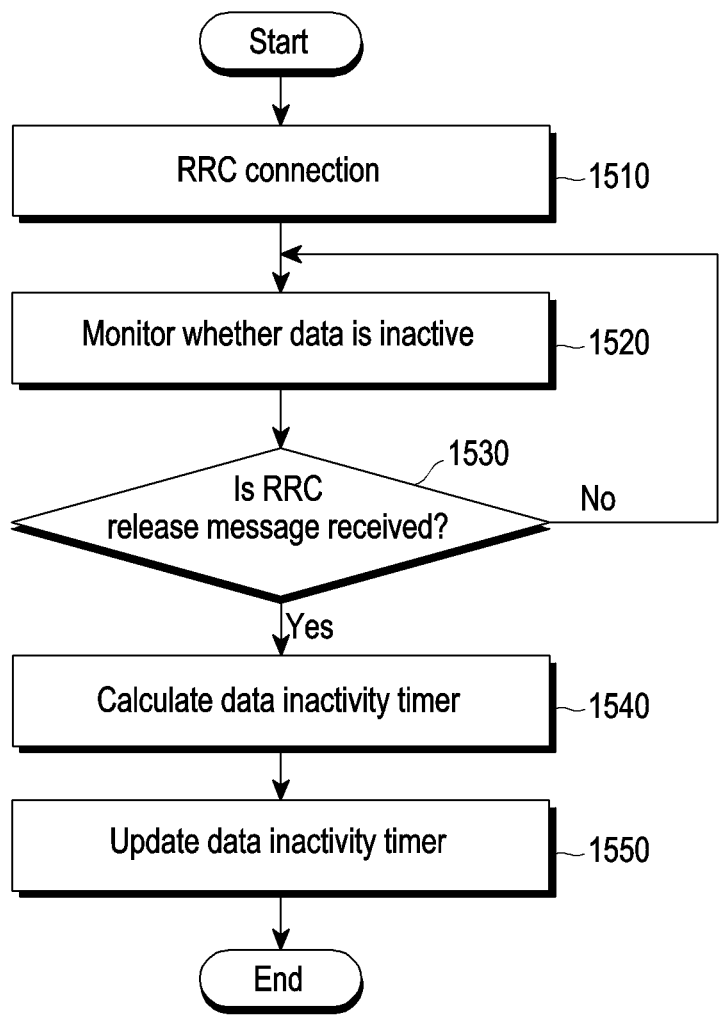
FIG. 15 illustrates a flowchart illustrating a method of identifying a data inactivity timer of an electronic device according to an embodiment of the disclosure.

FIG. 15 illustrates a flowchart illustrating a method of identifying a data inactivity timer of an electronic device according to an embodiment of the disclosure.

Referring to FIG. 15, the electronic device 101 may make an RRC connection with the base station in operation 1510. According to various embodiments, the electronic device 101 may monitor whether data is inactive in operation 1520. For example, when a medium access control (MAC) entity does not transmit/receive a MAC service data unit (SDU) (e.g., medium access control (MAC) data for a dedicated traffic channel (DTCH), a dedicated control channel (DCCH), and a common control channel (CCCH)), the electronic device 101 may determine that the data is inactive.

According to various embodiments, the electronic device 101 may receive an RRC release message from the base station in operation 1530. According to the data inactivity monitoring in operation 1520, the electronic device 101 may calculate a time for which the data inactivity state is maintained until the RRC release message is received in operation 1540 as a data inactivity timer setting value. The electronic device 101 may update the calculated data inactivity timer setting value from a preset value in operation 1550.

Figure 16:
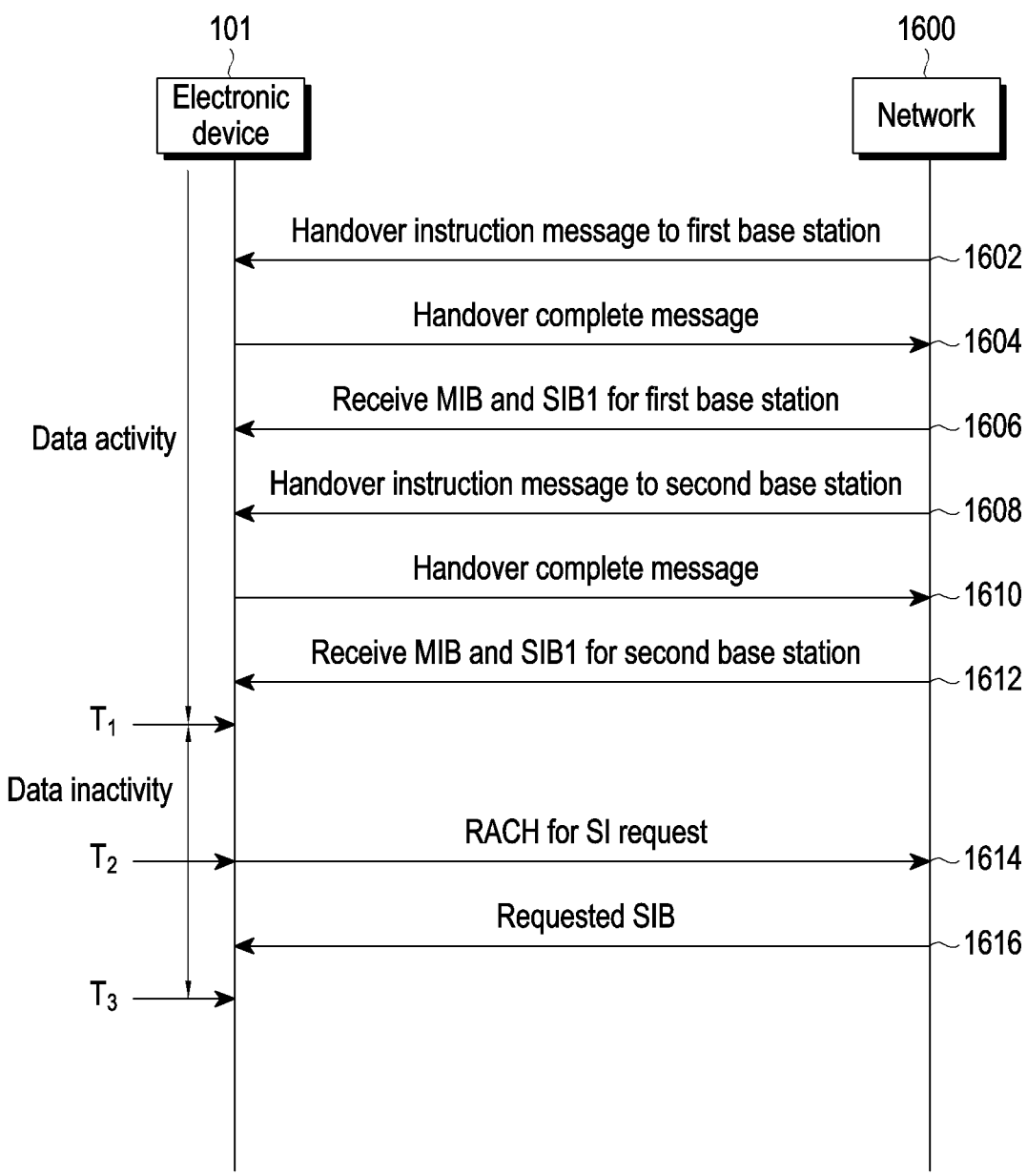
FIG. 16 illustrates a flowchart illustrating a method of receiving system information in an electronic device according to an embodiment of the disclosure.

FIG. 16 illustrates a flowchart illustrating a method of receiving system information in an electronic device according to an embodiment of the disclosure.

Referring to FIG. 16, the electronic device 101 may communicate with a specific base station on the network 1600 and receive a handover instruction message (or a handover command message) from the previous base station to the first base station 1101 in operation 1602. After performing handover from the previous base station to the first base station while maintaining the RRC connection according to the instruction, the electronic device 101 may transmit a handover complete message to the network 1600 in operation 1604.

According to various embodiments, the electronic device 101 may receive system information (e.g., MIB or SIB1) from a first base station newly accessed by handover in operation 1606. The electronic device 101 may maintain a data activity state by transmitting/receiving data with the first base station, thereby maintaining an RRC connection state. The electronic device 101 may receive a handover instruction message (or a handover command message) from the first base station to the second base station in operation 1608 in the RRC connection state with the first base station. After performing handover from the first base station to the second base station while maintaining the RRC connection according to the instruction, the electronic device 101 may transmit a handover complete message to the network 1600 in operation 1610.

According to various embodiments, the electronic device 101 may receive system information (e.g., MIB or SIB1) from a second base station newly accessed by handover in operation 1612. The electronic device 101 may maintain a data activity state by transmitting and receiving data with the second base station. According to various embodiments, when the data inactivity state is maintained at the first time point T1, the data inactivity timer may operate. The data inactivity timer may expire at a third time point T3, and the set value of the data inactivity timer may be T3−T1. The electronic device 101 may release RRC at the third time point when the data inactivity timer expires, and may be converted to an RRC idle state.

According to various embodiments, the electronic device 101 may transmit the system information request to the network 1600 at a second time point before a third time point when the data inactivity timer expires in operation 1614. In response to the request for the system information, the electronic device 101 may receive at least one piece of system information requested from the network 1600 in operation 1616.

According to various embodiments, the electronic device 101 may switch from the RRC connected state to the RRC idle state as the data inactivity timer expires because there is no data transmission/reception with the second base station until the third time point. For example, the electronic device 101 may perform an RRC connection release operation as a preset data inactivity timer expires.

Figure 17:
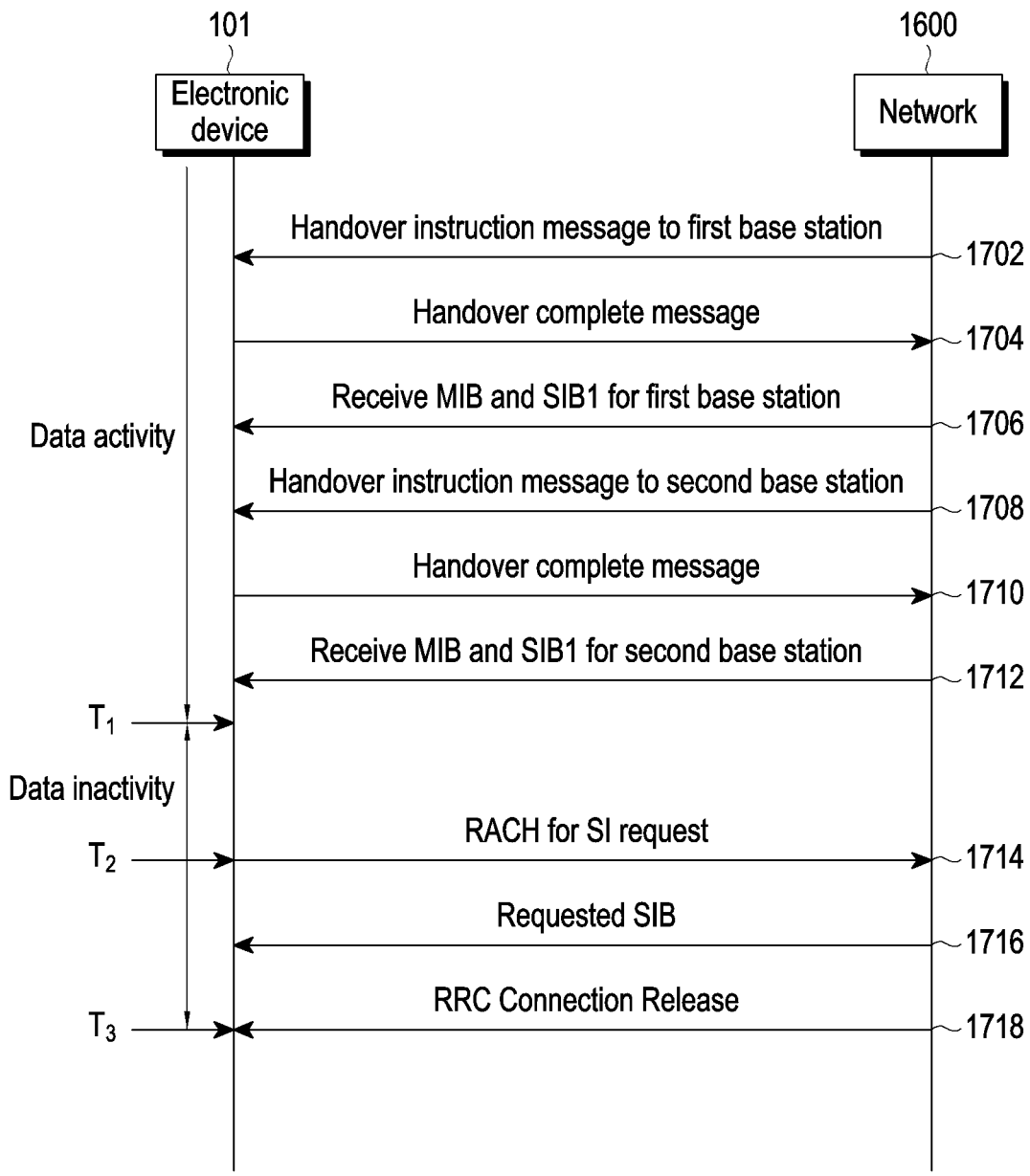
FIG. 17 illustrates a flowchart illustrating a method of receiving system information in an electronic device according to an embodiment of the disclosure.

FIG. 17 illustrates a flowchart illustrating a method of receiving system information in an electronic device according to an embodiment of the disclosure.

Referring to FIG. 17, the electronic device 101 may communicate with a specific base station on the network 1600 and receive a handover instruction message (or a handover command message) from the previous base station to the first base station 1101 in operation 1702. After performing handover from the previous base station to the first base station while maintaining the RRC connection according to the instruction, the electronic device 101 may transmit a handover complete message to the network 1600 in operation 1704.

According to various embodiments, the electronic device 101 may receive system information (e.g., MIB or SIB1) from a first base station newly accessed by handover in operation 1706. The electronic device 101 may maintain a data activity state by transmitting/receiving data with the first base station, thereby maintaining an RRC connection state. The electronic device 101 may receive a handover instruction message (or a handover command message) from the first base station to the second base station in operation 1708 in the RRC connection state with the first base station. After performing handover from the first base station to the second base station while maintaining the RRC connection according to the instruction, the electronic device 101 may transmit a handover complete message to the network 1600 in operation 1710.

According to various embodiments, the electronic device 101 may receive system information (e.g., MIB or SIB1) from a second base station newly accessed by handover in operation 1712. The electronic device 101 may maintain a data activity state by transmitting and receiving data with the second base station. According to various embodiments, when the data inactive state is maintained at the first time point T1 and an RRC connection release message is received from the network 1600 in operation 1718 at a third time point T3, the electronic device may be switched to the RRC idle state.

According to various embodiments, the electronic device 101 may transmit the system information request to the network 1600 at a second time point before a third time point at which the RRC connection release message is received in operation 1714. In response to the request for the system information, the electronic device 101 may receive at least one piece of system information requested from the network 1600 in operation 1716.

According to various embodiments, after receiving the system information requested according to the system information request in the RRC connection state, when the electronic device 101 receives the RRC connection release message from the network 1600 at the third time point, the electronic device 101 may switch from the RRC connection state to the RRC idle state. According to various embodiments, as described above with reference to FIG. 15, the electronic device 101 may store the data inactivity time (T3-T1) until the RRC connection release message is received in operation 1718 as a data inactivity timer setting value.

According to various embodiments, the set value of the data inactivity timer may be set and used by the electronic device 101 as a fixed value. According to various embodiments, after setting the initial value in the electronic device 101, the set value of the data inactivity timer may be updated to a newly set value based on the data inactivity time maintained until an RRC connection message is received from the network 1600 (e.g., base station) as described above in FIGS. 15 and 17.

An electronic device according to any one of various embodiments may include at least one antenna (e.g., the first antenna module 242, the second antenna module 244, or the third antenna module 246) and a communication processor (e.g., the wireless communication module 192, the first communication processor 212, the second communication processor 214, and the unified communication processor 260), and the communication processor is configured to transmit and receive data to and from a first base station connected by communication, through the at least one antenna, perform handover from the first base station to a second base station, receive first system information broadcast from the second base station, identify information related to a system information request based on the first system information, identify a time point for transmitting a system information request based on a data inactivity timer, and transmit a system information request to the second base station based on the information related to a system information request at the identified time point for transmitting the system information request.

According to various embodiments, the communication processor may be configured to control to transmit the system information request before the data inactivity timer expires.

According to various embodiments, the communication processor may be configured to identify, based on the first system information, that system information is set to information transmitted by request.

According to various embodiments, the communication processor may be configured to identify the time point for transmitting a system information request based at least on the strength of the signal received from the second base station.

According to various embodiments, the communication processor may be configured to identify the time point for transmitting a system information request based at least on reference signal received power (RSRP) of the received signal.

According to various embodiments, the time point for transmitting a system information request may be set earlier when the strength of the received signal is smaller than a threshold.

According to various embodiments, the communication processor may be configured to identify the time point for transmitting a system information request based at least on a transmission period of system information.

According to various embodiments, the communication processor may be configured to request the system information by a random access related message.

According to various embodiments, the communication processor may be configured to identify second information broadcast from the second base station, identify random access related information for transmitting a system information request included in the second information, and transmit the system information by a random access preamble based on the identified random access related information.

According to various embodiments, the communication processor may be configured to receive information on the data inactivity timer from the second base station.

A method of operating an electronic device according to any one of various embodiments may include transmitting and receiving data to and from a first base station through at least one antenna, performing a handover from the first base station to a second base station, receiving first system information broadcast from the second base station, identifying information related to a system information request based on the first system information, identifying a time point for transmitting a system information request based on a data inactivity timer, and transmitting a system information request to the second base station based on the information related to a system information request at the time point for transmitting a system information request.

According to various embodiments, the method may include transmitting the system information request before the data inactivity timer expires.

According to various embodiments, the method may include confirming, based on the first system information, that system information is set to information transmitted by request.

According to various embodiments, the method may include identifying the time point for transmitting a system information request based at least on a strength of the received broadcast signal.

According to various embodiments, the method may include identifying the time point for transmitting a system information request based at least on a reference signal received power (RSRP) of the received signal.

According to various embodiments, the time point for transmitting a system information request may be set earlier when the strength of the received broadcast signal is smaller than a threshold.

According to various embodiments, the method may include identifying the time point for transmitting a system information request based at least on a transmission period of system information.

According to various embodiments, the method may include transmitting the system information request through a random access related message.

According to various embodiments, the method may include identifying second information broadcast from the second base station, identifying random access-related information for transmitting a system information request included in the second information, and transmitting the system information request by a random access preamble based on the identified random access related information.

According to various embodiments, the method may include receiving information on the data inactivity timer from the second base station.

According to various embodiments, the time point for transmitting a system information request is based on the data inactivity timer reduced by a multiple of a transmission period of system information.

According to various embodiments, the time point for transmitting a system information request is reduced by at least two transmission periods of system information when the strength of the received broadcast signal is smaller than a threshold.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
at least one antenna; and
a processor configured to:
transmit and receive data to and from a first base station, through the at least one antenna,
perform a handover from the first base station to a second base station,
receive first system information broadcast from the second base station,
based on the first system information, identify information related to a system information request and a data inactivity timer,
configure a timer for transmitting the system information request using a first value obtained by multiplying a system information periodicity and a second value, and the data inactivity timer,
based on the data inactivity timer, identify a time point for transmitting the system information request,
monitor a data inactivity status based on the data inactivity timer,
restart the data inactivity timer based on the electronic device being transmitted data to the second base station, and based on the information related to the system information request, transmit the system information request to the second base station after the timer for transmitting the system information request expires and before the data inactivity timer expires, at the identified time point for transmitting the system information request, wherein the second value is set to 1 based on a reference signal received power (RSRP) equal to or greater than a threshold and the second value is set to 2 based on the RSRP below the threshold, and wherein the second value is configured based on an intensity of the RSRP.

2. The electronic device of claim 1, wherein the processor is further configured to:

based on the first system information, identify that system information is set to information transmitted by request.

3. The electronic device of claim 1, wherein the processor is further configured to:

identify the time point for transmitting the system information request based at least on a strength of a signal received from the second base station.

4. The electronic device of claim 3, wherein the processor is further configured to:

identify the time point for transmitting the system information request based at least on a reference signal received power (RSRP) of the received signal.

5. The electronic device of claim 3, wherein the time point for transmitting the system information request is set earlier when the strength of the received signal is smaller than a threshold.

6. The electronic device of claim 1, wherein the processor is further configured to:

identify the time point for transmitting the system information request based at least on a transmission period of the system information.

7. The electronic device of claim 1, wherein the processor is further configured to:

transmit the system information request by a random access related message.

8. The electronic device of claim 7, wherein the processor is further configured to:

identify second information broadcast from the second base station, identify random access related information for transmitting the system information request included in the second information, and based on the identified random access related information, transmit the system information request by a random access preamble.

9. The electronic device of claim 1, wherein the processor is further configured to:

receive information on the data inactivity timer from the second base station.

10. A method of receiving system information of an electronic device, the method comprising:

transmitting and receiving data to and from a first base station through at least one antenna;

performing a handover from the first base station to a second base station;

receiving first system information broadcast from the second base station;

based on the first system information, identifying information related to a system information request and a data inactivity timer;

configuring a timer for transmitting the system information request using the a first value obtained by multiplying a system information periodicity and a second value, and the data inactivity timer;

based on the data inactivity timer, identifying a time point for transmitting the system information request;

monitoring a data inactivity status based on the data inactivity timer, restarting the data inactivity timer based on the electronic device being transmitted data to the second base station, and based on the information related to the system information request, transmitting the system information request to the second base station after the timer for transmitting the system information request expires and before the data inactivity timer expires, at the identified time point for transmitting the system information request, wherein the second value is set to 1 based on a reference signal received power RSRP) equal to or greater than a threshold and the second value is set to 2 based on the RSRP below the threshold, and wherein the second value is configured based on an intensity of the RSRP.

11. The method of claim 10, further comprising:

identifying, based on the first system information, that system information is set to information transmitted by request.

12. The method of claim 10, further comprising:

identifying the time point for transmitting the system information request based at least on a strength of a signal received from the second base station.

13. The method of claim 12, further comprising:

identifying the time point for transmitting the system information request based at least on a reference signal received power (RSRP) of the received signal.

14. The method of claim 12, wherein the time point for requesting the transmitting the system information request is set earlier when the strength of the received signal is relatively smaller than a threshold.

15. The method of claim 10, further comprising:

identifying the time point for requesting the transmitting the system information request configured based at least on a transmission period of the system information.

16. The method of claim 10, further comprising:

requesting transmitting the system information request through a random access related message.

17. The method of claim 16, further comprising:

identifying second information broadcast from the second base station;

identifying random access related information for transmitting the system information request included in the broadcast second information; and based on the identified random access related information, requesting transmitting the system information by a random access preamble.

18. A non-transitory computer-readable storage media storing computer-executable instructions that, when executed by a processor of an electronic device, configure the electronic device to perform operations comprising:

transmitting and receiving data to and from a first base station through at least one antenna;

performing a handover from the first base station to a second base station;

receiving first system information broadcast from the second base station;

based on the first system information, identifying information related to a system information request and a data inactivity timer;
configuring a timer for transmitting the system information request using a first value obtained by multiplying a system information periodicity and a second value, and the data inactivity timer,
based on the data inactivity timer, identifying a time point for transmitting the system information request;
monitor a data inactivity status based on the data inactivity timer,
restart the data inactivity timer based on the electronic device being transmitted data to the second base station, and
based on the information related to the system information request, transmitting the system information request to the second base station after the timer for transmitting the system information request expires and before the data inactivity timer expires, at the identified time point for transmitting the system information request,
wherein the second value is set to 1 based on a reference signal received power (RSRP) equal to or greater than a threshold and the second value is set to 2 based on the RSRP below the threshold, and
wherein the second value is configured based on an intensity of the RSRP.

* * * * *